United States Patent
Kimes et al.

(10) Patent No.: US 9,441,708 B2
(45) Date of Patent: Sep. 13, 2016

(54) HIGH-EFFICIENCY DRIVE SYSTEM INCLUDING A TRANSMISSION FOR A HYBRID ELECTRIC VEHICLE

(71) Applicant: MEANS INDUSTRIES, INC., Saginaw, MI (US)

(72) Inventors: John W. Kimes, Wayne, MI (US); Philip B. Woodley, Chicago, IL (US)

(73) Assignee: MEANS INDUSTRIES, INC., Saginaw, MI (US)

( * ) Notice: Subject to any disclaimer, the term of this patent is extended or adjusted under 35 U.S.C. 154(b) by 0 days.

(21) Appl. No.: 14/882,505

(22) Filed: Oct. 14, 2015

(65) Prior Publication Data

US 2016/0047439 A1 Feb. 18, 2016

Related U.S. Application Data

(63) Continuation-in-part of application No. 14/086,202, filed on Nov. 21, 2013, now Pat. No. 9,186,977, and a continuation-in-part of application No. 14/487,322, filed on Sep. 16, 2014, and a continuation-in-part of (Continued)

(51) Int. Cl.
*F16H 3/72* (2006.01)
*F16H 3/00* (2006.01)

(Continued)

(52) U.S. Cl.
CPC .............. *F16H 3/006* (2013.01); *B60K 6/365* (2013.01); *B60K 6/387* (2013.01); *B60K 6/445* (2013.01); *B60K 6/547* (2013.01); *F16H 3/48* (2013.01); *F16H 3/728* (2013.01); *F16H 61/0202* (2013.01); *B60K 2006/381* (2013.01); *B60K 2741/22* (2013.01); *F16H 2003/007* (2013.01);

(Continued)

(58) Field of Classification Search
CPC .......... F16H 3/006; F16H 3/728; F16H 3/48; F16H 61/0202; F16H 2200/0039; F16H 2037/0886; F16H 2200/2023; F16H 2037/103; F16H 2200/0043; F16H 2200/2087; F16H 2200/2005; F16H 2003/007; F16H 2200/2094; F16H 2200/2064; B60K 6/445; B60K 6/365; B60K 6/547; B60K 6/387; B60K 2006/381; B60K 2741/22
See application file for complete search history.

(56) References Cited

U.S. PATENT DOCUMENTS 4,050,560 A 9/1977 Torstenfelt
5,052,534 A 10/1991 Gustin et al.
(Continued)

OTHER PUBLICATIONS

Notice of Allowance and Fee(S) Due; related U.S. Appl. No. 14/675,840, filed Apr. 1, 2015; date mailed Dec. 3, 2015.
(Continued)

*Primary Examiner* — David J Hlavka
(74) *Attorney, Agent, or Firm* — Brooks Kushman P.C.

(57) ABSTRACT

A high-efficiency drive system including a transmission for a hybrid electric vehicle is provided. The system includes a gear set having first, second and third elements. A non-friction clutch assembly is non-hydraulically controlled to change between a first coupling state for coupling the output shaft of an electrical machine to a transmission output shaft and an uncoupling state for uncoupling the output shaft of the electrical machine from the transmission output shaft. The clutch assembly is also non-hydraulically controlled to change between a second coupling state for coupling the output shaft of a non-electrical machine to the transmission output shaft and the uncoupling state for uncoupling the output shaft of the non-electrical machine from the transmission output shaft.

28 Claims, 19 Drawing Sheets

Related U.S. Application Data application No. 14/288,819, filed on May 28, 2014, now Pat. No. 9,234,552, which is a continuation-in-part of application No. 13/992,785, filed as application No. PCT/US2011/036634 on May 16, 2011, now Pat. No. 9,109,636.

(60) Provisional application No. 61/753,627, filed on Jan. 17, 2013, provisional application No. 61/882,694, filed on Sep. 26, 2013, provisional application No. 61/941,741, filed on Feb. 19, 2014, provisional application No. 61/870,434, filed on Aug. 27, 2013, provisional application No. 61/421,856, filed on Dec. 10, 2010, provisional application No. 62/090,628, filed on Dec. 11, 2014.

(51) Int. Cl.

| | | |
|---|---|---|
| *F16H 3/48* | (2006.01) | |
| *F16H 61/02* | (2006.01) | |
| *B60K 6/547* | (2007.10) | |
| *B60K 6/365* | (2007.10) | |
| *B60K 6/387* | (2007.10) | |
| *B60K 6/445* | (2007.10) | |
| B60K 6/38 | (2007.10) | |
| F16H 37/08 | (2006.01) | |
| F16H 37/10 | (2006.01) | |

(52) U.S. Cl.
CPC . *F16H 2037/0886* (2013.01); *F16H 2037/103* (2013.01); *F16H 2200/0039* (2013.01); *F16H 2200/0043* (2013.01); *F16H 2200/2005* (2013.01); *F16H 2200/2023* (2013.01); *F16H 2200/2064* (2013.01); *F16H 2200/2087* (2013.01); *F16H 2200/2094* (2013.01); *Y02T 10/6239* (2013.01); *Y10S 903/902* (2013.01)

(56) References Cited

U.S. PATENT DOCUMENTS

| | | | |
|---|---|---|---|
| 5,206,573 A | 4/1993 | McCleer et al. | |
| 5,231,265 A | 7/1993 | Hackett et al. | |
| 5,362,293 A | 11/1994 | Romanauskas | |
| 5,387,854 A | 2/1995 | McCleer et al. | |
| 5,394,321 A | 2/1995 | McCleer et al. | |
| 5,453,598 A | 9/1995 | Hackett et al. | |
| 5,638,929 A | 6/1997 | Park | |
| 5,642,009 A | 6/1997 | McCleer et al. | |
| 5,678,668 A | 10/1997 | Sink | |
| 5,847,469 A | 12/1998 | Tabata et al. | |
| 5,856,709 A | 1/1999 | Ibaraki et al. | |
| 5,918,715 A | 7/1999 | Ruth et al. | |
| 5,927,455 A | 7/1999 | Baker et al. | |
| 5,934,395 A | 8/1999 | Koide et al. | |
| 6,019,699 A | 2/2000 | Hoshiya et al. | |
| 6,075,302 A | 6/2000 | McCleer | |
| 6,193,038 B1 | 2/2001 | Scott et al. | |
| 6,244,965 B1 | 6/2001 | Klecker et al. | |
| 6,290,044 B1 | 9/2001 | Burgman et al. | |
| 6,306,057 B1 | 10/2001 | Morisawa et al. | |
| 6,344,008 B1 | 2/2002 | Nagano et al. | |
| 6,503,167 B1 | 1/2003 | Sturm | |
| 6,814,201 B2 | 11/2004 | Thomas | |
| 6,846,257 B2 | 1/2005 | Baker et al. | |
| 6,953,409 B2 | 10/2005 | Schmidt et al. | |
| 6,982,502 B1 | 1/2006 | Sendaula et al. | |
| 7,093,512 B2 | 8/2006 | Ibamoto et al. | |
| 7,153,228 B2 | 12/2006 | Fujiu et al. | |
| 7,198,587 B2 | 4/2007 | Samie et al. | |
| 7,201,690 B2 | 4/2007 | Miura et al. | |
| 7,223,198 B2 | 5/2007 | Kimes et al. | |
| 7,223,200 B2 | 5/2007 | Kojima et al. | |
| 7,237,634 B2 | 7/2007 | Severinsky et al. | |
| 7,255,186 B2 | 8/2007 | Wakuta et al. | |
| 7,256,510 B2 | 8/2007 | Holmes et al. | |
| 7,258,214 B2 | 8/2007 | Pawley et al. | |
| 7,275,628 B2 | 10/2007 | Pawley et al. | |
| 7,300,374 B2 * | 11/2007 | Bucknor | B60K 6/387 |
| | | | 475/5 |
| 7,344,010 B2 | 3/2008 | Fetting, Jr. et al. | |
| 7,349,010 B2 | 3/2008 | Bryant et al. | |
| 7,393,296 B2 | 7/2008 | Kano et al. | |
| 7,397,296 B1 | 7/2008 | Kiani | |
| 7,426,971 B2 | 9/2008 | Kano et al. | |
| 7,464,801 B2 | 12/2008 | Wittkopp | |
| 7,484,605 B2 | 2/2009 | Pawley et al. | |
| 7,491,151 B2 | 2/2009 | Maguire et al. | |
| 7,614,466 B2 | 11/2009 | Kano et al. | |
| 7,621,359 B2 | 11/2009 | Kano et al. | |
| 7,632,201 B2 | 12/2009 | Takami et al. | |
| 7,633,247 B2 | 12/2009 | Obayashi | |
| 7,690,455 B2 | 4/2010 | Kano et al. | |
| 7,806,795 B2 | 10/2010 | Oba et al. | |
| 7,942,781 B2 | 5/2011 | Kimes | |
| 8,079,453 B2 | 12/2011 | Kimes | |
| 8,382,624 B2 | 2/2013 | Li et al. | |
| 2003/0102196 A1 | 6/2003 | Wetzel et al. | |
| 2006/0138777 A1 | 6/2006 | Hofbauer et al. | |
| 2006/0185957 A1 | 8/2006 | Kimes et al. | |
| 2007/0056825 A1 | 3/2007 | Fetting et al. | |
| 2007/0072725 A1 * | 3/2007 | Bucknor | B60K 6/40 |
| | | | 475/5 |
| 2007/0278061 A1 | 12/2007 | Wittkopp et al. | |
| 2008/0110715 A1 | 5/2008 | Pawley | |
| 2008/0169165 A1 | 7/2008 | Samie et al. | |
| 2008/0169166 A1 | 7/2008 | Wittkopp et al. | |
| 2008/0185253 A1 | 8/2008 | Kimes | |
| 2008/0223681 A1 | 9/2008 | Stevenson et al. | |
| 2009/0084653 A1 | 4/2009 | Holmes | |
| 2009/0098970 A1 | 4/2009 | Kimes | |
| 2009/0127059 A1 | 5/2009 | Knoblauch | |
| 2009/0133981 A1 | 5/2009 | Tarasinski et al. | |
| 2009/0142207 A1 | 6/2009 | Ring et al. | |
| 2009/0159391 A1 | 6/2009 | Eisengruber | |
| 2009/0194381 A1 | 8/2009 | Samie et al. | |
| 2009/0209381 A1 * | 8/2009 | Ai | B60K 6/26 |
| | | | 475/5 |
| 2009/0255773 A1 | 10/2009 | Seufert et al. | |
| 2010/0200358 A1 | 8/2010 | Eisengruber et al. | |
| 2010/0230226 A1 | 9/2010 | Prout | |
| 2010/0252384 A1 | 10/2010 | Eisengruber | |
| 2011/0177900 A1 | 7/2011 | Simon | |
| 2012/0145505 A1 | 6/2012 | Kimes | |
| 2012/0149518 A1 | 6/2012 | Kimes | |
| 2012/0152683 A1 | 6/2012 | Kimes | |
| 2012/0152687 A1 | 6/2012 | Kimes et al. | |
| 2014/0080648 A1 * | 3/2014 | Kimes | B60K 6/543 |
| | | | 475/5 |
| 2014/0100071 A1 | 4/2014 | Kimes | |
| 2015/0000442 A1 * | 1/2015 | Kimes | F16D 23/02 |
| | | | 74/335 |

OTHER PUBLICATIONS

Notice of Allowance and Fee(s) Due; related U.S. Appl. No. 14/086,202; dated Sep. 14, 2015.
Office Action; related U.S. Appl. No. 14/675,840; dated Oct. 2, 2015.
International Preliminary Report on Patentability; related International application No. PCT/JS2014/056716; date of issuance of report Mar. 29, 2016.
International Preliminary Report on Patentability; related International application No. PCT/US2014/056749; date of issuance of report Mar. 29, 2016.
International Preliminary Report on Patentability; related International application No. PCT/US2014/057140; date of issuance of report Mar. 29, 2016.
International Search Report and Written Opinion; related International application No. PCT/US2016/013836; date of mailing Mar. 30, 2016.

* cited by examiner

Four Mode Powersplit Hybrid

Mode 1: EV Mode (Launch)

Mode 2: Hybrid Mode (Low speed)

Mode 3: OD1 (Mid range 45 - 70 MPH?)

Mode 4: OD2 (Highway range > 70 MPH)

Four Mode Powersplit Hybrid

Multi-Mode Powersplit Hybrid

Multi-Mode Powersplit Hybrid

Multi-Mode Powersplit Hybrid

Mode 1a: EV Mode (Launch)

Mode 1b: EV Mode (Launch + Gen Boost)

Mode 2: Hybrid Mode (Low Speed)

Mode 3: OD1 (Mid range 45 - 70 MPH)

Mode 4: OD2 (Highway range > 70 MPH)

Mode 5: Electric/Serial Hybrid/Powersplit/Electric Boost REV options

Mode 5: REV Option 1 - Current Reverse

Mode 5: REV Option 2 - Serial Hybrid

Mode 5: REV Option 3 - Powersplit

Mode 5: REV Option 4 - Electric Boost

Mode N: Neutral (Tow Mode)

Multi-Mode Powersplit Hybrid Gear in Overdrive Modes

Multi-Mode Powersplit Hybrid Alternative

Mode 1a: EV Mode (Launch)

Mode 1b: EV Mode (Launch + Gen Boost)

Mode 2: Hybrid Mode

Mode 3: OD1 (Mid range TBD 45-70 MPH?)

Mode 4: OD2 (Mid range TBD 70+ MPH?)

HIGH-EFFICIENCY DRIVE SYSTEM INCLUDING A TRANSMISSION FOR A HYBRID ELECTRIC VEHICLE

CROSS REFERENCE TO RELATED APPLICATIONS

This application claims the benefit of U.S. provisional patent application Ser. No. 62/090,628 filed Dec. 11, 2014. This application is a continuation-in-part U.S. patent application Ser. No. 14/086,202 filed Nov. 21, 2013, now U.S. Pat. No. 9,186,977, which claims the benefit of U.S. provisional patent application Ser. No. 61/753,627 filed on Jan. 17, 2013. This application is also a continuation-in-part of U.S. patent application Ser. No. 14/487,322 filed Sep. 16, 2014 which claims the benefit of provisional patent application Ser. No. 61/882,694 filed Sep. 26, 2013. This application is a continuation-in-part of U.S. patent application Ser. No. 14/288,819 filed May 28, 2014, which claims the benefit of U.S. provisional patent application Ser. No. 61/941,741 filed Feb. 19, 2014 and 61/870,434 filed Aug. 27, 2013 and which is a continuation-in-part of U.S. Ser. No. 13/992,785 filed Jun. 10, 2013, now U.S. Pat. No. 9,109,636, which is a 371 of PCT/US2011/036634 filed May 16, 2011 which, in turn, claims the benefit of 61/421,856, filed Dec. 10, 2010.

TECHNICAL FIELD

This invention relates to hybrid electric vehicle power trains or drive systems including transmissions with electrical machines.

OVERVIEW

A battery electric vehicle (BEV) is a type of electric vehicle (EV) that uses chemical energy stored in rechargeable battery packs. BEVs use electric motors and motor controllers instead of internal combustion engines (ICEs) for propulsion.

A battery-only electric vehicle or all-electric vehicle derives all its power from its battery packs and thus has no internal combustion engine, fuel cell, or fuel tank.

Vehicles using both electric motors and internal combustion engines are examples of hybrid electric vehicles, and are not considered pure or all-electric vehicles because they cannot be externally charged (operate in charge-sustaining mode) and instead they are continually recharged with power from the internal combustion engine and regenerative braking.

A plug-in hybrid electric vehicle (PHEV), plug-in hybrid vehicle (PHV), or plug-in hybrid is a hybrid vehicle which utilizes rechargeable batteries, or another energy storage device, that can be restored to full charge by connecting a plug to an external electric power source (usually a normal electric wall socket). A PHEV shares the characteristics of both a conventional hybrid electric vehicle, having an electric motor and an internal combustion engine (ICE); and of an all-electric vehicle, having a plug to connect to the electrical grid. Most PHEVs on the road today are passenger cars, but there are also PHEV versions of commercial vehicles and vans, utility trucks, buses, trains, motorcycles, scooters, and military vehicles.

U.S. patent document 2014/0100071 discloses a plug-in HEV. The basic Power Split architecture (as detailed in U.S. Pat. No. 7,632,201) is widely understood to be one of the most efficient transmission architectures currently produced for hybrid electric vehicle (HEV) drive systems. This architecture achieves significant fuel savings by using a gearset planetary as a mechanical Continuously Variable Transmission (CVT), and through manipulation of the inputs from two electric motors allows the Internal Combustion Engine (ICE) to operate at its most efficient speed torque output point through a significant portion of the drive cycle. However, the powertrain suffers from an inherent lack of an effective "Overdrive" mode of operation which would allow for more efficient operation of the vehicle powertrain at highway speeds. At highway speed it is desirable that the tractive force is supplied entirely by the ICE for optimal fuel economy.

One solution has been to hold the sun gear stationary with a grounding clutch (as detailed in U.S. Pat. No. 8,382,624). This mode eliminates the need to ground the sun gear node with the motor generator 2 (MG2) which would normally be used for this purpose and consumes power in the process. Alternatively, an output lay shaft with a fixed overdrive ratio to input may be added with a clutch between the two that can be used to engage this Overdrive gear.

In either of these cases, the output traction motor generator (MG1) is still attached to the ring gear node of the gearset. Even though MG1 is not contributing significantly to the tractive force of the powertrain at highway speeds (due to the inefficiency of operation at higher speed) it is still being driven to rotate by the output tractive force provided by the ICE. This consumes power through eddy current loss, spin loss, and unnecessary inertial loads which still provide significant losses to the powertrain during highway speed operation.

A multiple-ratio (i.e., step-ratio) automatic transmission in an automotive vehicle powertrain adjusts a gear ratio between a torque source and a driveshaft to meet drivability requirements under dynamically-changing driving conditions. Ratio changes are achieved by engaging a so-called on-coming clutch ("OCC") as a so-called off-going clutch ("OGC") is released. The clutches, which may be referred to as transmission friction elements or brakes, establish and disestablish power flow paths from an internal combustion engine to vehicle traction wheels. During acceleration of the vehicle, the overall speed ratio, which is the ratio of transmission input shaft speed to transmission output shaft speed, is reduced as vehicle speed increases for a given engine throttle settling. This is an up-shift.

In the case of a synchronous up-shift, the OCC engages to lower both the gear ratio (i.e., the overall speed ratio) and the torque ratio (the ratio of output torque to input torque). The synchronous up-shift event can be divided into three phases, which may be referred to as a preparatory phase, a torque phase, and an inertia phase. The torque phase is a time period when the OCC torque is controlled to decrease toward a non-significant level with an intention to disengage it. Simultaneously, during the torque phase, the OCC is controlled to increase from a non-significant level, thereby initiating the OCC engagement according to a conventional up-shift control.

The clutch engagement and disengagement timing results in a momentary activation of two torque flow paths through the gearing, thereby causing torque delivery to drop momentarily at the transmission output shaft. This condition, which can be referred to as a "torque hole," occurs before the OGC disengages. A vehicle occupant can perceive a large torque hole as an unpleasant shift shock. The preparatory phase is a time period prior to the torque phase. The inertia phase is a time period when the OGC starts to slip due to substantially reduced holding capacity, following the torque phase.

Automated manual transmission (AMT), a type of automatic shifting transmission used in motor vehicles, improves mechanical efficiency by removing the torque converter. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. During a shift of an AMT, the engine torque is disconnected from the vehicle via a clutch. The torque is interrupted while the transmission changes ratio. After the ratio is changed, the clutch reapplies connecting the engine back to the drivetrain. The problem with this approach is that during the torque interruption, the driver is lunged forward in the cab and then lunged backwards when the engine hooks back up with the drivetrain. This shift event can be as long as a second. It is an undesirable shift feel. Also the vehicle has no acceleration during this transition leading to undesirable driving situations (pulling out into traffic, merging, etc.).

Today's step ratio automatic transmissions use hydraulics to power the ratio change, dampen NVH (i.e., noise, vibration and harshness), power coupling/decoupling, and providing lubrication and cooling. This is achieved with the use of a torque converter (for coupling/decoupling power, multiplying torque, and NVH dampening), an oil pump, valve body (or hydraulic logic), and friction-type clutches (bands and frictions which are activated by hydraulics to selectively lock and release components).

Multi-Plate Friction-Type Clutches and Brakes

Clutches and brakes are used to drive or hold members of a planetary gear set, respectively. As a general rule, multi-plate clutches connect one planetary member to another. Multi-plate brakes connect a planetary member to the transmission case to hold it stationary.

The clutches and brakes consist of a number of friction discs and steel discs. The friction discs are coated with a friction material and have engaging lugs (splines) on the inner perimeter. The steel discs are steel on both sides and have engaging lugs located on the outer perimeter. The engaging lugs on the friction discs are usually engaged with a planetary member. The engaging lugs on the steel discs are usually engaged with the clutch piston housing.

In addition to the friction and steel discs, there is also an apply piston, housing and return spring. Once hydraulic fluid is applied to the clutch assembly, the piston advances and the friction and steel discs will be locked together. Once the hydraulic pressure is released, the return spring will cause the piston to return to its rest position and the friction and steel discs will be unlocked.

A band-type brake is used for some applications. The brake band is a circular band with friction material bonded to the inner surface. The band wraps around a particular planetary component (clutch drum) and locks that component to the transmission case. The brake band is applied and released by the clutch apply piston.

In order to carry out a shift in ratio, fluid needs to be applied or released from the multi-plate clutch (or brake). The following method occurs:

1. Fluid from a shift valve in the valve body is applied to the clutch assembly.
2. Fluid pressure builds behind the apply piston and overcomes the resistance from diaphragm spring.
3. The friction and steel discs are compressed together and become locked, preventing any slippage between them.
4. Two planetary members are now locked together.
5. When fluid pressure is released, the steel and friction discs are allowed to unlock.

This method has had some advantages. The power density is very high using hydraulics to clamp clutches and to multiply torque. Hydraulic systems have proven to have good dampening characteristics and smooth shift capability. It is also a natural way to lubricate the components in the transmission and to carry away heat from torque converters, pumps, gear sets, bearings, etc.

However, there are a few disadvantages. The first is efficiency. The pump is always on and pumping oil whenever the engine is running. When a friction element is turned on, power is used to maintain the clamping pressure of that friction element.

The slipping of the torque converter is also a significant source of parasitic loss and the open friction elements in the transmission provide drag and thus parasitic losses also. Another disadvantage is the complexity of these components. Clutches, pumps, torque converters, and valve bodies are among the most likely components within a transmission to have issues and thus drive warranty cost and negatively impact upon customer satisfaction. These components also tend to be the most expensive components in the transmission.

A one-way clutch (i.e., OWC) produces a drive connection (locked state) between rotating components when their relative rotation is in one direction, and overruns (freewheel state) when relative rotation is in the opposite direction. A typical one-way clutch consists of an inner ring, an outer ring and a locking device between the two rings. Two types of one-way clutches often used in vehicular, automatic transmissions include:

Roller type which consists of spring loaded rollers between the inner and outer race of the one-way clutch. (Roller type is also used without springs on some applications); and Sprag type which consists of asymmetrically shaped wedges located between the inner and outer race of the one-way clutch.

The one-way clutches are typically used in the transmission to prevent an interruption of drive torque (i.e., power flow) during certain gear shifts and to prevent engine braking during coasting. Also, there is a one-way clutch in the stator of the torque converter.

A controllable OWC is an OWC where the lock action can be turned "off" such that it freewheels in both directions, and/or the lock action can be turned "on" such that it locks in one or both directions.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission.

U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

Other related U.S. patent publications include: 2012/0152683; 2012/0152687; 2012/0145505; 2012/0149518; 2011/0177900; 2010/0252384; 2009/0133981; 2009/0127079; 2009/0084653; 2009/0194381; 2009/0142207; 2009/0255773; 2010/0230226; 2010/0200358; 2009/0159391; 2009/0098970; 2008/0223681; 2008/0110715; 2008/0169166; 2008/0169165; 2008/0185253; 2007/

0278061; 2007/0056825; 2006/0138777; 2006/0185957; and the following U.S. Pat. Nos. 8,079,453; 7,942,781; 7,806,795; 7,491,151; 7,464,801; 7,349,010; 7,275,628; 7,256,510; 7,223,198; 7,198,587; 7,093,512; 6,953,409; 6,846,257; 6,814,201; 6,503,167; 6,193,038; 4,050,560; 5,638,929; 5,362,293; 5,678,668; 5,052,534; 5,387,854; 5,231,265; 5,394,321; 5,206,573; 5,453,598; 5,642,009; 6,075,302; 6,982,502; 7,153,228; and 5,918,715.

U.S. patents which describe hybrid transmissions or power trains include: U.S. Pat. Nos. 5,847,469; 5,856,709; 5,934,395; 6,019,699; 6,306,057; 6,344,008; 7,201,690; 7,223,200; 7,237,634; 7,255,186; 7,393,296; 7,397,296; 7,426,971; 7,614,466; 7,621,359; 7,633,247; and 7,690,455.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

A linear motor is an electric motor that has had its stator and rotor "unrolled" so that instead of producing a torque (rotation) it produces a linear force along its length. The most common mode of operation is a Lorentz-type actuator, in which the applied force is linearly proportional to the current and the magnetic field. U.S. published application 2003/0102196 discloses a bi-directional linear motor.

Linear stepper motors are used for positioning applications requiring rapid acceleration and high speed moves with low mass payloads. Mechanical simplicity and precise open look operation are additional features of stepper linear motor systems.

A linear stepper motor operates on the same electromagnetic principles as a rotary stepper motor. The stationary part or platen is a passive toothed steel bar extending over the desired length of travel. Permanent magnets, electro-magnets with teeth, and bearings are incorporated into the moving elements or forcer. The forcer moves bi-directionally along the platen, assuring discrete locations in response to the state of the currents in the field windings. In general, the motor is two-phase, however a larger number of phases can be employed.

The linear stepper motor is well known in the prior art and operates upon established principles of magnetic theory. The stator or platen component of the linear stepper motor consists of an elongated, rectangular steel bar having a plurality of parallel teeth that extends over the distance to be traversed and functions in the manner of a track for the so-called forcer component of the motor.

The platen is entirely passive during operation of the motor and all magnets and electromagnets are incorporated into the forcer or armature component. The forcer moves bi-directionally along the platen assuming discrete locations in response to the state of the electrical current in its field windings.

Mechanical forces that are due to local or distant magnetic sources, i.e. electric currents and/or permanent magnet (PM) materials, can be determined by examination of the magnetic fields produced or "excited" by the magnetic sources. A magnetic field is a vector field indicating at any point in space the magnitude and direction of the influential capability of the local or remote magnetic sources. The strength or magnitude of the magnetic field at a point within any region of interest is dependent on the strength, the amount and the relative location of the exciting magnetic sources and the magnetic properties of the various mediums between the locations of the exciting sources and the given region of interest. By magnetic properties one means material characteristics that determine "how easy" it is to, or "how low" a level of excitation is required to, "magnetize" a unit volume of the material, that is, to establish a certain level of magnetic field strength. In general, regions which contain iron material are much easier to "magnetize" in comparison to regions which contain air or plastic material.

Magnetic fields can be represented or described as three dimensional lines of force, which are closed curves that traverse throughout regions of space and within material structures. When magnetic "action" (production of measurable levels of mechanical force) takes place within a magnetic structure these lines of force are seen to couple or link the magnetic sources within the structure. Lines of magnetic force are coupled/linked to a current source if they encircle all or a portion of the current path in the structure. Force lines are coupled/linked to a PM source if they traverse the PM material, generally in the direction or the anti-direction of the permanent magnetization. Individual lines of force or field lines, which do not cross one another, exhibit levels of tensile stress at every point along the line extent, much like the tensile force in a stretched "rubber band," stretched into the shape of the closed field line curve. This is the primary method of force production across air gaps in a magnetic machine structure.

One can generally determine the direction of net force production in portions of a magnetic machine by examining plots of magnetic field lines within the structure. The more field lines (i.e. the more stretched rubber bands) in any one direction across an air gap separating machine elements, the more "pulling" force between machine elements in that given direction.

SUMMARY OF EXAMPLE EMBODIMENTS

An object of at least one embodiment of the present invention is to provide a drive system including a transmission for a hybrid electric vehicle and having enhanced highway fuel economy.

In carrying out the above object and other objects of at least one embodiment of the present invention, a high-efficiency drive system including a transmission for a hybrid electric vehicle is provided. The system includes a gear set including first, second and third elements. The first element connects with a transmission output shaft. An output shaft of a non-electrical machine connects with the second element for driving the second element. The system includes a transmission housing and a first electrical machine having a first output shaft connecting with the first element and the transmission output shaft for driving the transmission output shaft in response to an electrical signal. A second electrical machine has a second output shaft connecting with the third element for driving the third element. The output shaft of the non-electrical machine connects with the third element through the second element for driving the third element. A non-friction clutch assembly is non-hydraulically controlled to change between a first coupling state for coupling either the first or second output shaft to the transmission output shaft and an uncoupling state for uncoupling the coupled output shaft from the transmission output shaft. The clutch assembly is also non-hydraulically controlled to change between a second coupling state for coupling the output shaft of the non-electrical machine to the transmission output shaft and the uncoupling state for uncoupling the output shaft of the non-electrical machine from the transmission output shaft.

The gear set may be a planetary gear set wherein the first, second and third elements comprise a ring gear, a carrier and a sun gear, respectively.

The system may be a plurality of different operating modes including a reverse gear or operating mode powered both electrically and non-electrically.

The system may have a plurality of different operating modes including an overdrive operating mode powered non-electrically. The output shaft of the non-electrical machine may be coupled to the transmission output shaft in the overdrive operating mode.

The overdrive operating mode may be a first overdrive operating mode having a first gear ratio wherein the system has a second overdrive operating mode having a second gear ratio different from the first gear ratio and powered non-electrically.

The system may further include a non-friction brake assembly having a coupling state for coupling the third element to the housing and an uncoupling state for uncoupling the third element from the housing, the brake assembly being non-hydraulically controlled to change state.

The clutch assembly may include a switchable linear actuator device to control the coupling state of the clutch assembly.

The actuator device may include a stator structure including at least one electromagnetic source to create an electromagnetically switched magnetic field and a translator structure including a magnetically latching permanent magnet source magnetically coupled to the stator structure across a radial air gap and supported for translational movement relative to the stator structure along an axis between a plurality of predefined discrete axial positions which correspond to different coupling states of the clutch assembly.

The brake assembly may include an electromechanical apparatus connecting with the output shaft of the second electrical machine.

The first electrical machine may be an electric motor.

The second electrical machine may be an electric motor-generator unit.

The non-electrical machine may comprise an internal combustion engine.

The transmission may be a power-split transmission.

Further in carrying out the above object and other objects of at least one embodiment of the present invention, a high-efficiency drive system including a transmission for a hybrid electric vehicle is provided. The system includes a gear set including first, second and third elements. The first element connects with a transmission output shaft and an output shaft of a non-electrical machine connects with the second element for driving the second element. The system further includes a transmission housing and a first electrical machine having a first output shaft connecting with the first element and the transmission shaft for driving the transmission output shaft in response to an electrical signal. A second electrical machine has a second output shaft connecting with the third element for driving the third element. The output shaft of the non-electrical machine connects with the third element through the second element for driving the third element. A first non-friction clutch assembly is non-hydraulically controlled to change between a first coupling state for coupling either the first or second output shaft to the transmission output shaft and an uncoupling state for uncoupling the coupled output shaft from the transmission output shaft. The first non-friction clutch assembly is also non-hydraulically controlled to change between a second coupling state for coupling the output shaft of the non-electrical machine to the transmission output shaft and the uncoupling state for uncoupling the output shaft of the non-electrical machine from the transmission output shaft. The system also includes a second non-friction clutch assembly which is non-hydraulically controlled to change between a first coupling state for coupling the output shaft of the non-electrical machine to the second element and an uncoupling state for uncoupling the output shaft of the non-electrical machine from the second element. The second clutch assembly is also non-hydraulically controlled to change between a second coupling state for coupling the output shaft of the non-electrical machine to the third element and the uncoupling state for uncoupling the output shaft of the non-electrical machine from the third element.

The gear set may be a planetary gear set wherein the first, second and third elements comprise a ring gear, a carrier and a sun gear, respectively.

The system may be a plurality of different operating modes including a reverse gear or operating mode powered both electrically and non-electrically.

The system may be a plurality of different operating modes including an overdrive operating mode powered non-electrically wherein the output shaft of the non-electrical machine is coupled to the transmission output shaft in the overdrive operating mode.

The overdrive operating mode may be a first overdrive operating mode having a first gear ratio wherein the system also has a second overdrive operating mode having a second gear ratio different from the first gear ratio and powered non-electrically.

The system may further include a non-friction brake assembly having a coupling state for coupling the third element to the housing and an uncoupling state for uncoupling the third element from the housing. The brake assembly is non-hydraulically controlled to change state.

Each clutch assembly may include a switchable linear actuator device to control the coupling state of the clutch assembly.

Each actuator device may include a stator structure including at least one electromagnetic source to create an electromagnetically switched magnetic field and a translator structure including a magnetically latching permanent magnet source magnetically coupled to the stator structure across a radial air gap and supported for translational movement relative to the stator structure along an axis between a plurality of predefined discrete axial positions which correspond to different coupling states of the clutch assembly.

The brake assembly may include an electromechanical apparatus connecting with the output shaft of the second electrical machine.

The first electrical machine may be an electric motor.

The second electrical machine may be an electric motor-generator unit.

The non-electrical machine may comprise an internal combustion engine.

The transmission may be a power-split transmission.

The brake assembly may be a first brake assembly wherein the system further includes a second brake assembly having a coupling state for coupling the second element to the housing and an uncoupling state for uncoupling the second element from the housing. The second brake assembly may be non-hydraulically controlled to change state.

The second brake assembly may include an electromechanical apparatus.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
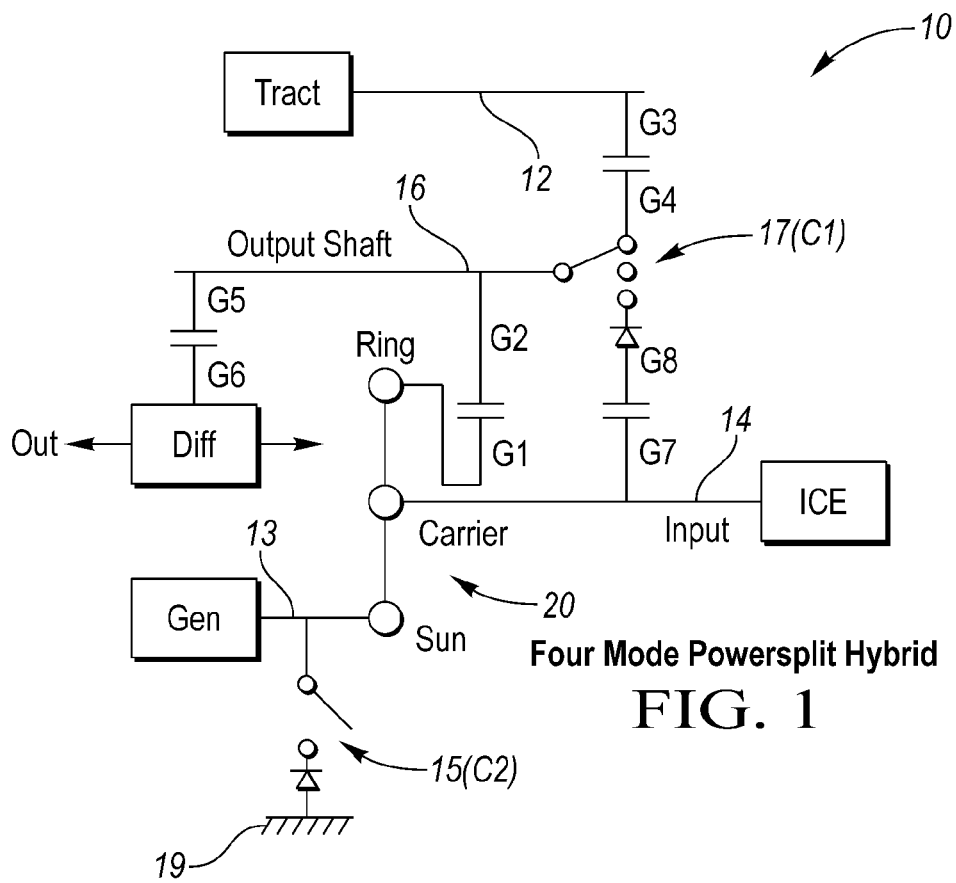
FIG. 1 is a schematic block diagram of high-efficiency drive system including a transmission for a four mode, power-split, hybrid electric vehicle and constructed in accordance with at least one embodiment of the present invention.

FIG. 1 is a schematic block diagram of a first embodiment of a high-efficiency drive system including a transmission, generally indicated at 10, for a hybrid electric vehicle. Because of similarities in hardware between FIGS. 1-6, only FIG. 1 has reference numbers. The transmission may be a powersplit transmission for a car or truck that has a plurality of different operating modes including an EV mode, a hybrid mode, and first and second overdrive gas modes.

Figure 12:
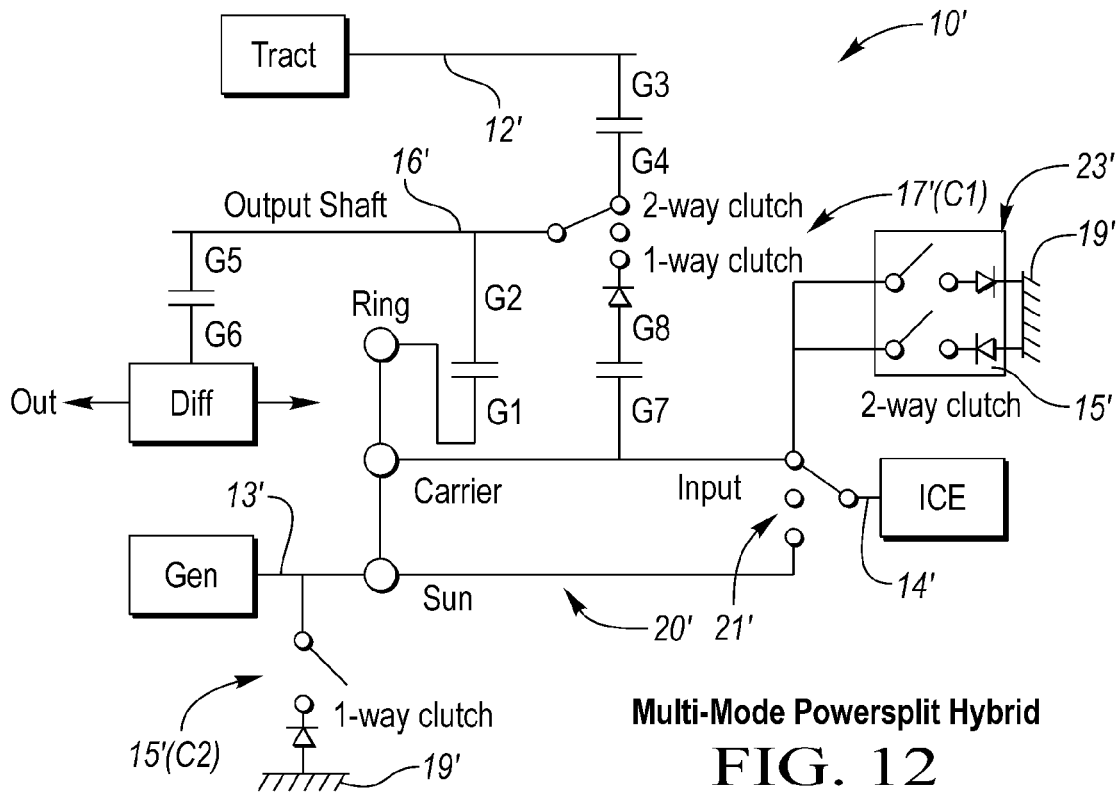
FIG. 12 is a schematic block diagram of a high-efficiency drive system including a transmission for a multi-mode, power-split, hybrid electric vehicle and constructed in accordance with at least one other embodiment of the present invention.

In a second embodiment, a system 10' is shown in FIG. 12. The system 10' includes a transmission having hybrid operating modes including a reverse gear or operating mode in FIG. 22 powered electrically and by an internal combustion engine ("ICE" in the drawing figures). In other words, the reverse gear need not be powered solely electrically.

Figure 28:
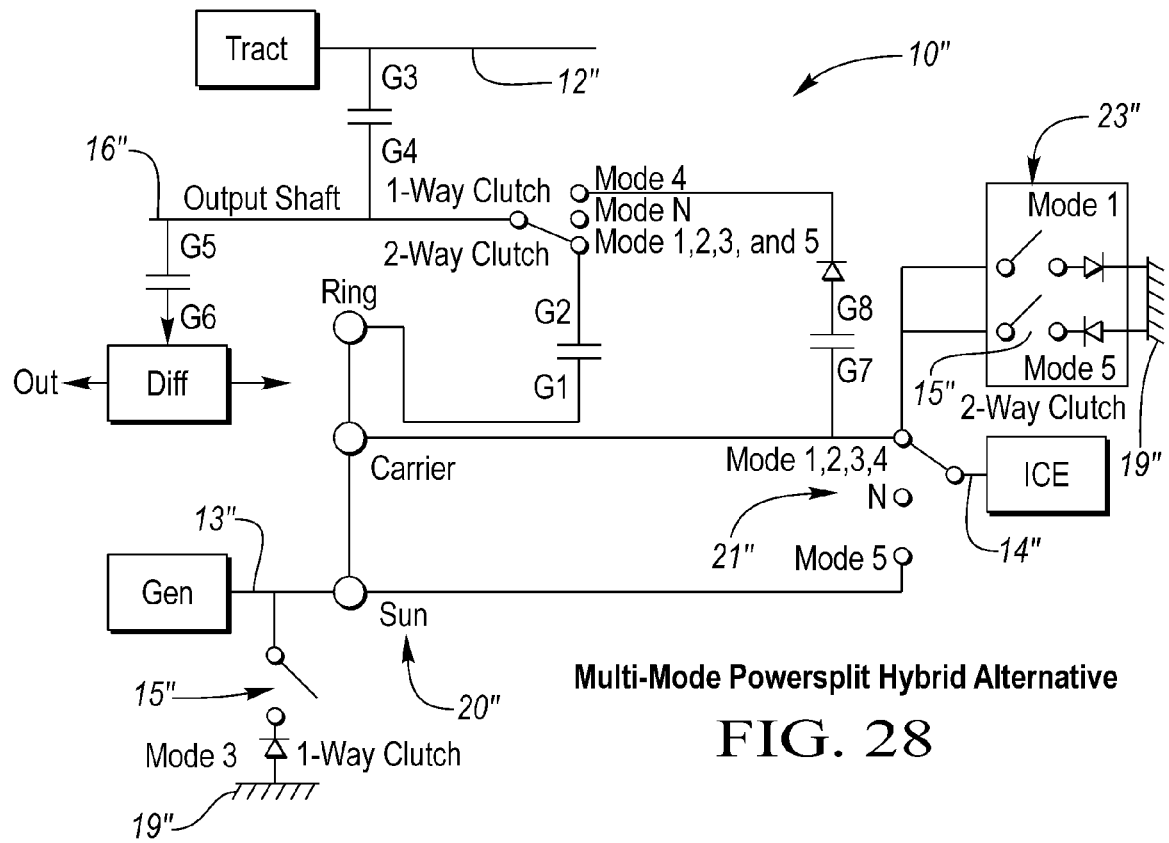
FIG. 28 is a schematic block diagram of a high-efficiency drive system including a transmission for a multi-mode, power split, hybrid electric vehicle and constructed in accordance with yet another embodiment of the present invention.

In a third embodiment, a system 10" is shown in FIG. 28. The system 10" includes a transmission having hybrid operating modes including a reverse gear or operating mode in FIG. 34.

The system 10 includes a first electrical machine in the form of a traction electric motor ("Tract" in the drawing figures) and a power transducer or second electrical machine in the form of an electric motor-generator unit ("Gen", in the drawing figures). The unit is a power transducer that can be used as either an electric motor or a generator, converting between electrical power and mechanical power as is well known in the art of hybrid electric vehicle drive systems. The system 10 connects to an output (labeled "Input" in many of the drawing figures) shaft 14 of the gas or internal combustion engine ("ICE" in the drawing figures). The system 10 includes a rotary output shaft 12 of the traction motor, a rotary output shaft 13 of the motor-generator unit, the output shaft 14 of the ICE, and a transmission output shaft 16.

A first group of gears (G3 and G4) connects with the shaft 12 for rotation therewith. A second group of gears (G7 and G8) connects with the shaft 14 for rotation therewith. A third group of gears (G5 and G6) connects with the transmission output shaft 16. The transmission output shaft 16 is connected to a differential drive (i.e. "Diff" in many of the drawing figures). A fourth group of gears (G1 and G2) connects with the transmission output shaft 16 for rotation therewith.

The transmission 10 preferably includes a planetary gear set, generally indicated at 20, comprising three elements or members. The gear set 20 includes a basic gear set whose planet carrier carries a set of planet pinions, a sun gear and a ring gear.

The torque transmitting members include ring, carrier and sun members or gears and are associated with the electric traction motor. The sun gear is driven by the motor generator unit (Gen). The ring gear rotates with the output shaft 16 of the transmission 10 through the gears G1 and G2. The carrier is associated with the output shaft 14 of the ICE.

Figure 7:
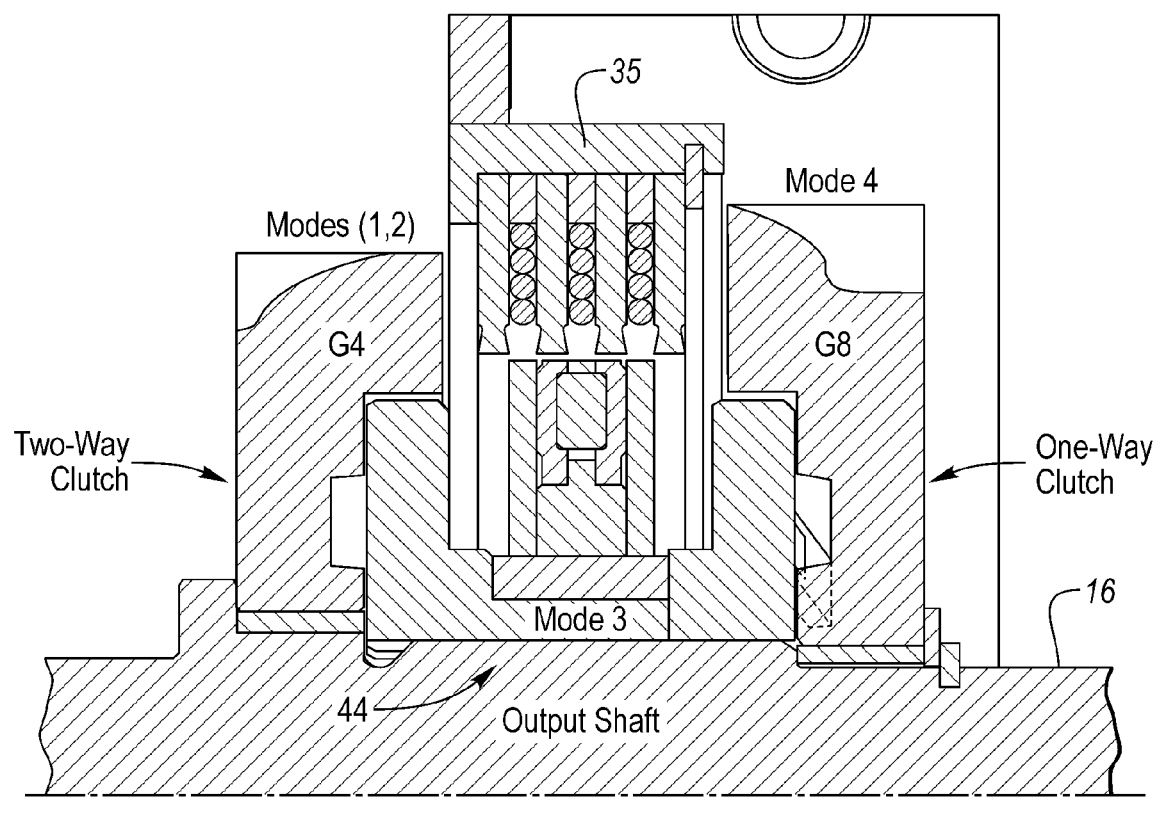
FIG. 7 is a schematic diagram, partially broken away, of a non-friction clutch assembly comprising a 3-position linear stepper motor dynamic, controllable mechanical diode (CMD) and coupling assemblies or clutches for use in the system of FIGS. 1-6.
Figure 8:
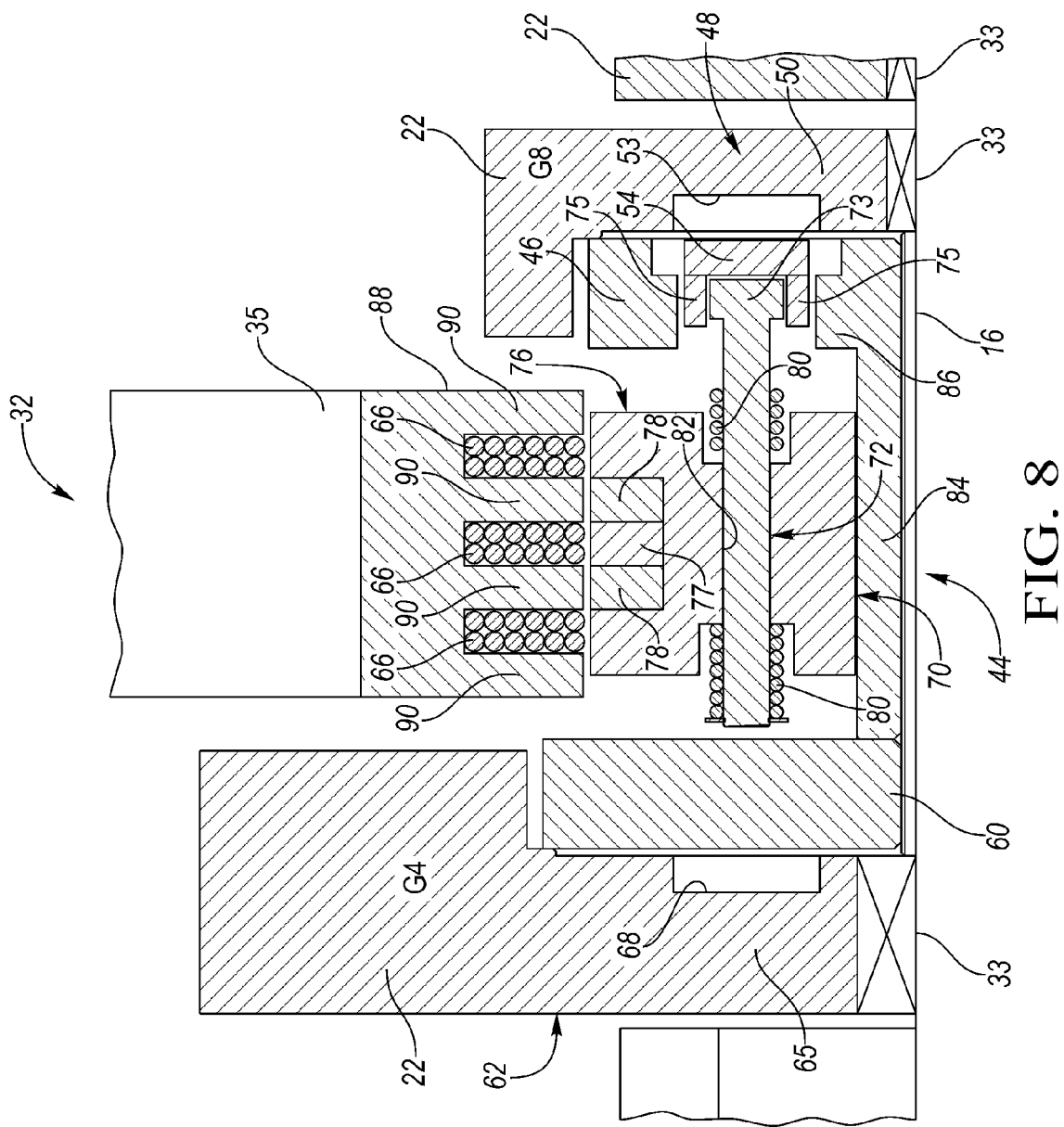
FIG. 8 is an enlarged view of the 3-position, linear stepper motor and coupling assemblies of FIG. 7.
Figure 9:
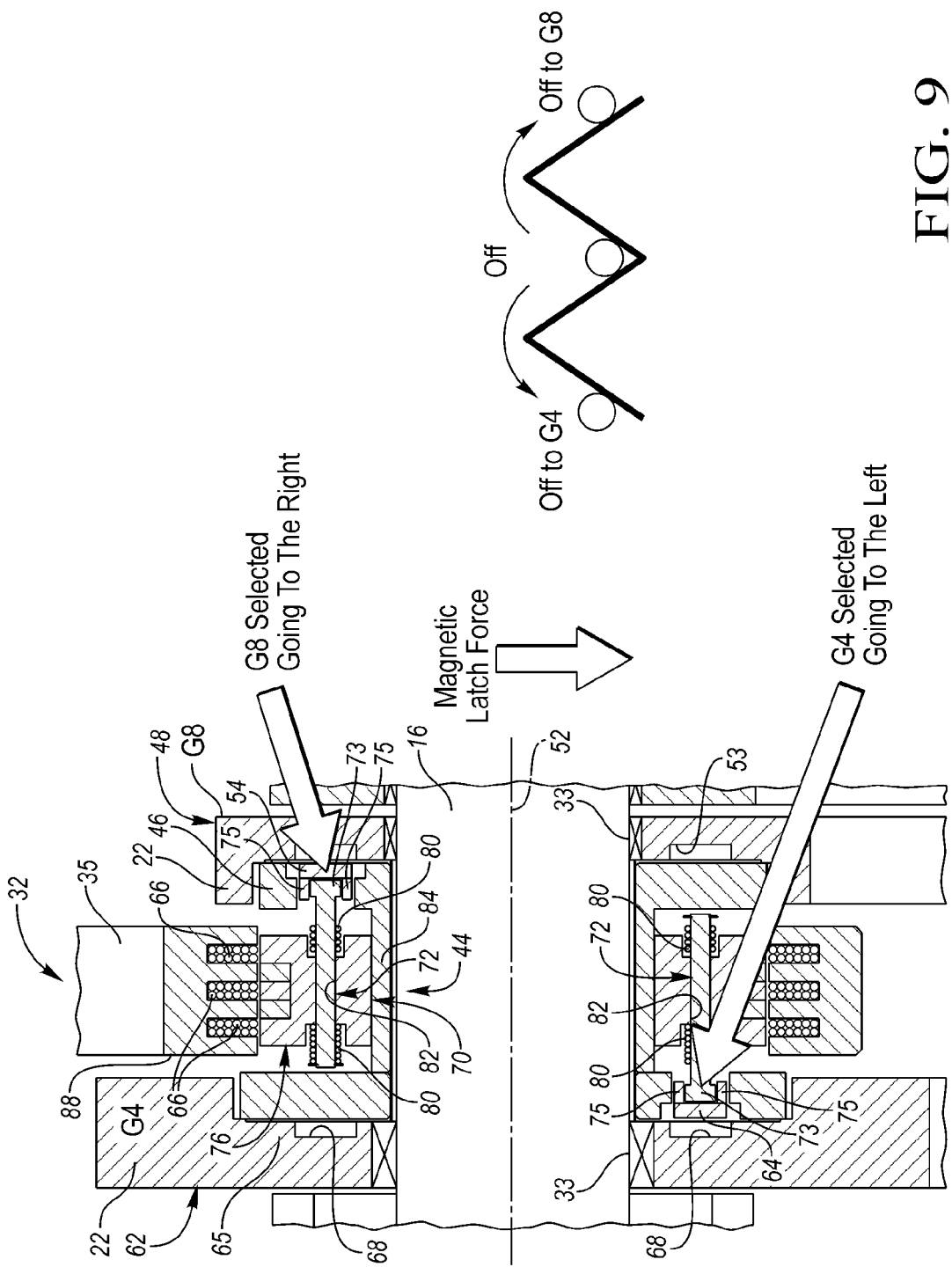
FIG. 9 is a schematic diagram of the stepper motor of FIGS. 7 and 8 latching two, 2-way controllable mechanical diodes (i.e. coupling assemblies)

A coupling or clutch assembly 17 (i.e. C1) includes a 3-position linear stepper motor, generally indicated at 44 in FIGS. 7, 8 and 9. The 3-position linear stepper motor 44 forms a part of the overrunning, non-friction coupling or clutch and control assembly 32. The clutch system of FIG. 7 is added to the output shaft 16 between G4 and G8. The motor 44 includes a stator subassembly 35 and as disclosed in corresponding U.S. patent application Ser. No. 14/487, 322 filed Sep. 16, 2014 which is hereby incorporated in its entirety by reference herein. Except for the reference numbers 16, 35 and 44, FIG. 7 does not include the reference numbers of FIGS. 8 and 9 since the structures or hardware illustrated therein are substantially the same.

The assembly 32 includes a first pair of coupling members or plates 46 and 48 (G8). The plate 46 is a pocket plate and the plate 48 is the powdered metal gear 22 integrated with a notch plate 50 which has notches 53. The plates 46 and 48 are supported for rotation relative one another about a common rotational axis 52 of the output shaft 16. The plate 48 is supported on the shaft 16 by the bearing 33. A first locking member or strut 54 selectively mechanically couples the first pair or plates 46 and 48 together to prevent relative rotation of the first pair of plates 46 and 48 with respect to each other in at least one direction about the axis 52.

The assembly 32 also includes a second pair of coupling members or plates 60 and 62 (G4) supported for rotation relative to one another about the common rotational axis 52 and a second locking member or strut 64 for selectively mechanically coupling the second pair of plates 60 and 62 together to prevent relative rotation of the second pair of plates 60 and 62 with respect to each other in at least one direction about the axis 52. The gear 22 is integrally formed with a plate 65 to form the plate 62 which has notches 68.

The stepper motor 44 includes the stator subassembly 35 including at least one coil 66 (three shown) to create an electromagnetically switched magnetic field and to create a magnetic flux when the at least one coil 66 is energized.

The stepper motor 44 further includes a magnetically-latching actuator subassembly, generally indicated at 70, including at least one bi-directionally movable connecting structure, such as spring-biased rods, generally indicated at 72. Each rod 72 is coupled to one of the first and second locking members 54 or 64 at an end portion 73 thereof for selective, small-displacement locking member movement. In particularly, each end portion 73 is pivotally connected to legs 75 of its locking member or strut 54 or 64 by pins (not shown but shown in the above mentioned provisional application).

The actuator subassembly 70 further includes a magnetic actuator, generally indicated at 76, coupled to the rods 72 and mounted for controlled reciprocating movement along the rotational axis 52 relative to the first and second pairs of coupling members 46, 48, 60 and 62 between a first extended position which corresponds to a first mode of the first pair of coupling members 46 and 48 and a second extended position which corresponds to a second mode of the second pair of coupling members 60 and 62.

The first rod 72 actuates the first locking member 54 in its extended position, so that the first locking member 54 couples the first pair of coupling members 46 and 48 for rotation with each other in at least one direction about the rotational axis 52. The second rod 72 actuates the second locking member 64 to couple the second pair of coupling members 60 and 62 for rotation with each other in at least one direction about the rotational axis 52. The magnetic actuator 76 completes a path of the magnetic flux to magnetically latch in the first and second extended positions. A control force caused by the magnetic flux is applied to linearly move the magnetic actuator 76 between the first and second extended positions along the rotational axis 52.

The magnetic actuator 76 preferably includes a permanent magnet source 77 sandwiched between a pair of annular field redirection rings 78. The magnetic source 77 is preferably an annular, rare earth magnet which is axially magnetized.

In other words, the electromechanical apparatus or motor 44 controls the operating mode of a pair of coupling apparatus, each of which has drive and driven members supported for rotation relative to one another about the common rotational axis 52 of the output shaft 16. Each drive member may be a pocket plate 46 or 60 and the driven member may be a notch plate 50 or 65. Each coupling apparatus or assembly may include two struts 54 or 64 for selectively mechanically coupling the members of each coupling assembly together and change the operating mode of each coupling assembly. Preferably, the struts 54 and 64 are spaced at 90° and/or 180° intervals about the axis 52.

The apparatus or motor 44 includes the stator subassembly 35 which has one or more (preferably three) electromagnetically inductive coils 66 to create a first magnetic flux when the coils 66 are energized.

The apparatus or motor 44 also includes the actuator subassembly 70 adapted for coupling with the members or plates of both of the coupling apparatus to rotate therewith. The motor 44 is supported on the output shaft 16 for rotation relative to the coils 66 about the rotational axis 52. The motor 44 typically includes two or more bi-directionally movable rods 72. Each rod 72 has the free end 73 adapted for connection to a strut for selective, small-displacement, strut movement.

The motor 44 also includes the actuator 76 operatively connected to the rods 72 for selective bi-directional shifting movement along the rotational axis 52 between a first position of the actuator 76 which corresponds to a mode of the first coupling apparatus (plate 50 and plate 46) and a second position of the actuator 76 which corresponds to a mode of the coupling apparatus (plate 60 and plate 65). The two rods 72 are spaced 180° apart from one another. The different modes may be locked and unlocked (i.e. freewheeling) modes.

A first magnetic control force is applied to the actuator 76 when the at least one coil 66 is energized to cause the actuator 76 to move between its first, second, and neutral positions along the axis 52 as shown in the right hand side of FIG. 9.

The motor 44 includes a pair of spaced biasing spring members 80 for each rod 72 for exerting corresponding biasing forces on the actuator 76 in opposite directions along the axis 52 when the actuator 76 moves between its first, second and third positions along the axis 52. The actuator 76 has a hole 82 for slideably receiving and retaining the connecting rods 72. When the actuator 76 moves, it pushes/pulls its respective springs between its faces and the ends of its corresponding rods 72.

The motor 44 includes a hub 84 adapted for coupling with plates 46 and 60 of the two coupling apparatus. The hub 84 is splined for rotation with the shaft 16 about the rotational axis 52. The hub 84 slidably supports the actuator 76 during corresponding shifting movement along the rotational axis 52.

The motor 44 includes of spaced stops, only one of which is shown at 86, supported on the hub 84 to define the first and second positions of the actuator 76.

The motor 44 also preferably includes a set of spaced guide pins (not shown) sandwiched between inner surface of the actuator 76 and an outer surface of the hub 84 and extending along the rotational axis 52. The inner surfaces and the outer surface have V-shaped grooves or notches (not shown) formed therein to hold the guide pins. The actuator 76 slides on the guide pins during shifting movement of the actuator 76 along the rotational axis 52. The guide pins pilot the actuator 76 on the hub 84. The hub 84 also distributes oil to the guide pins.

The stator subassembly 35 includes a ferromagnetic housing 88 having spaced apart fingers 90 and the electromagnetically inductive coils 66 housed between adjacent fingers 90.

The actuator 76 is an annular part having the magnetic annular ring 77 sandwiched between the pair of ferromagnetic backing rings 78. The magnetic control forces magnetically bias the fingers 90 and their corresponding backing rings 78 into alignment upon coil energization. These forces latch the actuator 76 in the two "on" positions and the "off" position. The rings are acted upon by the stator subassembly 35 to move the actuator 76.

A hollow cylindrical bushing (not shown) may slidably support each rod 76 in its aperture 82 during bi-directional shifting movement thereof.

Referring again to FIG. 9, the 3-position linear stepper motor 44 is shown magnetically latching the 2-way and one-way clutch assemblies. In the upper portion of FIG. 9, the 8$^{th}$ gear (G8) is selected for rotation going to the right. In the lower portion of FIG. 9, the fourth gear (G4) is selected going to the left. As shown in the saw-tooth graph in FIG. 9, the magnetic latch force is "off" in the center.

Figure 10:
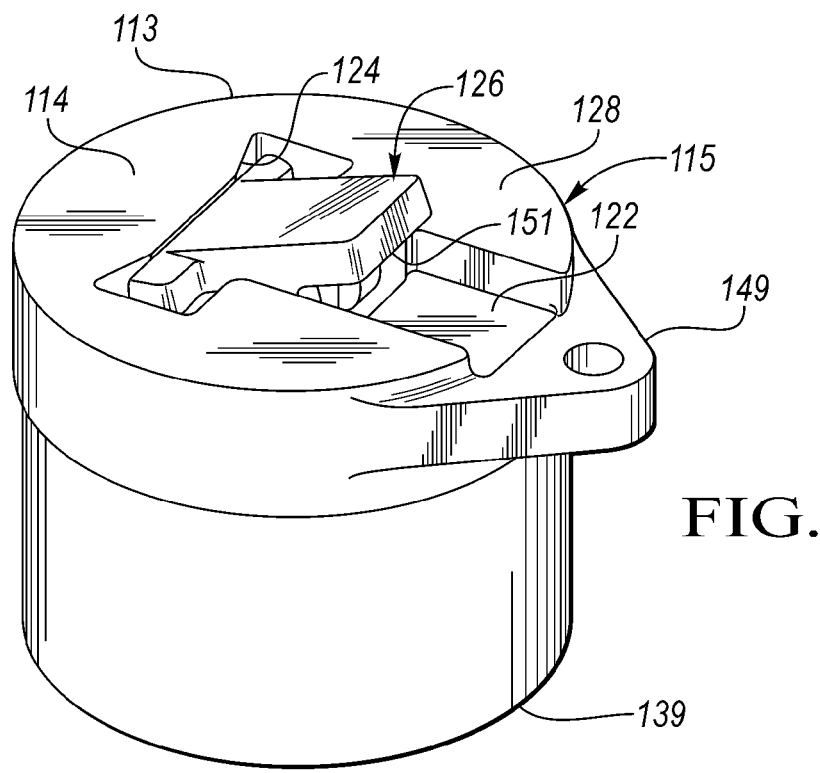
FIG. 10 is a top perspective view of a selectable solenoid insert (SSI) or electromechanical apparatus utilized in various operating modes of the system with a locking member or strut in its extended coupling position.
Figure 11:
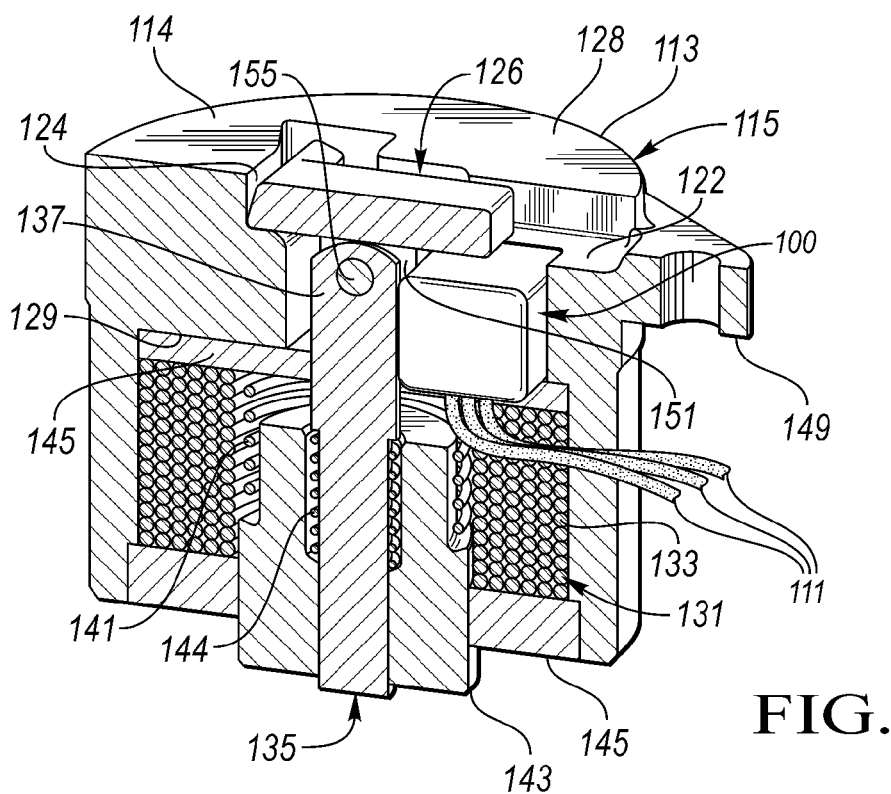
FIG. 11 is a side perspective sectional view of the apparatus of FIG. 10 with the locking strut in its retracted, uncoupling position.

Referring to FIGS. 10 and 11, there is generally illustrated an SSI (selectable solenoid insert) or the solenoid 115. The SSI 115 is disclosed in U.S. patent application Ser. No. 14/288,819 filed May 28, 2014 which is hereby incorporated in its entirety by reference herein. The SSI would be inserted into the case near the Gen. The shaft 13 (which is also the sun gear shaft) would have a notch plate attached that would engage the SSI.

As disclosed in U.S. Ser. No. 14/288,819, a planar, controllable coupling assembly is disclosed. The assembly includes a first coupling member, the notch plate or member (not shown), a second coupling member (not shown) and the electromechanical apparatus 115. The coupling assembly may be a ratcheting, 1-way brake assembly 15 (C2) A first member 112 includes a coupling face 116 in closed-spaced opposition with an outer coupling face 114 of a housing part 113 of the solenoid 115 when the first and second members are assembled and held together by a locking or snap ring (not shown). One of the members is mounted on the output shaft 13 via the notch plate for rotation about a common rotational axis and the other of the members is fixedly secured to the transmission housing or case 19.

The outer coupling face 114 of the housing part 113 has a single, T-shaped recess or pocket 122. The recess 122 defines a load-bearing first shoulder 124. The second coupling face 116 of the notch plate 112 has a plurality of recesses or notches 123. Each notch of the notches 123 defines a load-bearing second shoulder.

The electromechanical apparatus or solenoid 115 may include a locking strut or element, generally included at 126, disposed between the coupling faces 114 and 116 of the housing part 113 and the member 112, respectively, when the member 112 is assembled with the member holding the apparatus 115.

Figure 13:
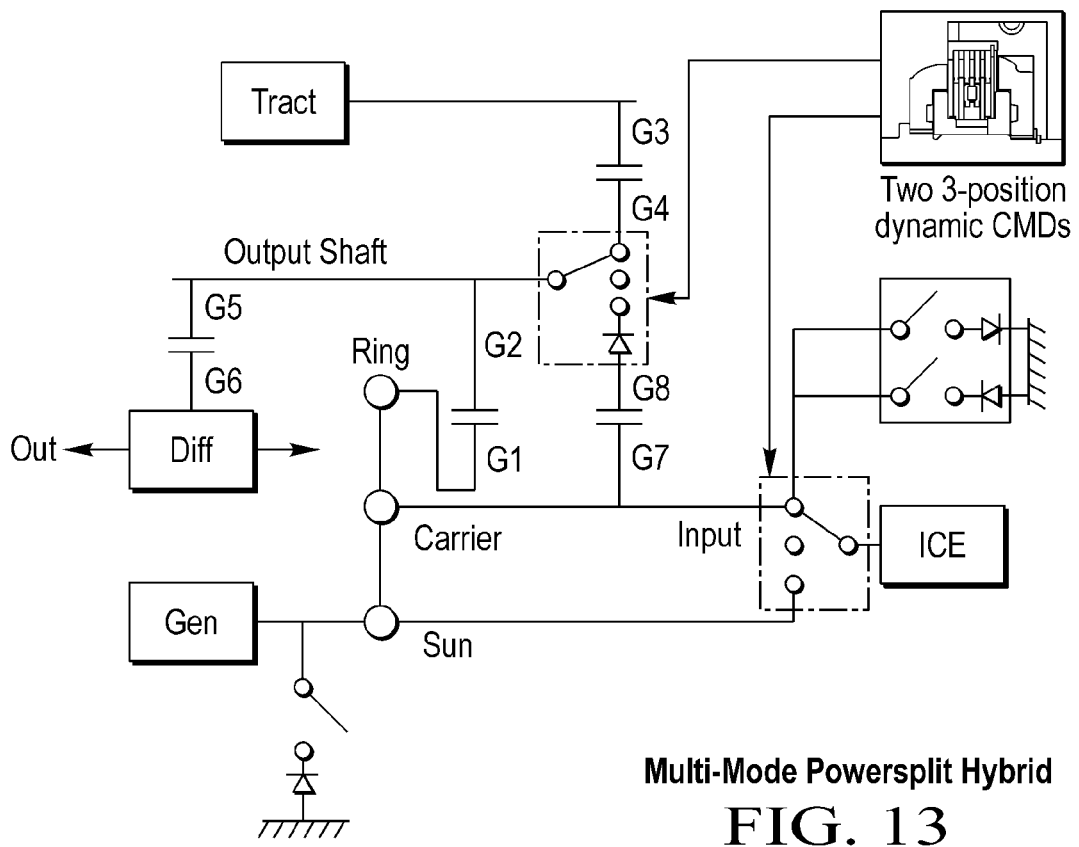
FIG. 13 is a view similar to the view of FIG. 12 with two, 3-position dynamic controllable mechanical diodes (CMDs) specifically called out.

The element 126 may comprise a metal locking element or strut movable between first and second positions. The first position is characterized by abutting engagement of the locking element 126 with a load-bearing shoulder of the member 112 and the shoulder 124 of the pocket 122 (FIG. 12) formed in an end wall 128 of the housing part 113. The second position is characterized by non-abutting engagement of the locking element 126 with a load-bearing shoulder of at least one of the member 112 and the end wall 128 (FIG. 13).

Alternatively, the element 126 may be an impact energy storage element or synthetic rubber strut, to dampen the rotation between the member 112 and the member holding the apparatus 115.

The electromechanical apparatus 115 includes the housing part 113 which has a closed axial end including the end wall 128. The end wall 128 has the outer coupling face 114 with the single pocket 122 which defines the load-bearing shoulder 124 which is in communication with an inner face 129 of the end wall 128. The housing part 113 may be a powdered metal or aluminum (MIM) part.

The apparatus 115 also includes an electromagnetic source, generally indicated at 131, including at least one excitation coil 133 which is at least partially surrounded by the housing part 115.

The element or strut 126 is received within the pocket 122 in a retracted, uncoupling position (FIG. 13). The strut 126 is movable outwardly from the pocket 122 to an extended, coupling position (FIG. 12) characterized by abutting engagement of the strut 126 with a load-bearing shoulder of the notch plate 112.

The apparatus 115 also includes a reciprocating armature, generally indicated at 135, arranged concentrically relative to the at least one excitation coil 133 and is axially movable when the at least one excitation coil 133 is supplied with current. The armature 135 is connected at its leading end 137 to the element 126 to move the element 126 between its coupling and uncoupling positions.

When the element of the apparatus 115 is the rigid locking element 126, the element 126 controls the operating mode of the coupling assembly. When the element of the apparatus 115 is the previously described impact energy storage element, the element absorbs and stores impact energy to reduce undesirable noise and contact stress caused by a transition between operating modes of the coupling assembly.

Whether the element or strut is a locking element or an energy storage element, the element is pivotally connected to the leading end 137 of the armature 135 wherein the armature 135 pivotally moves the element within the pocket 122 in response to reciprocating movement of the armature 135.

The apparatus 115 also preferably includes a return spring 141, upper and lower plates 145, a spring 144, and a hollow tube 143. The coil 133 is wound about the tube 143 between the plates 145. The armature 135 reciprocates within the hollow tube 143. The spring 141 and the tube 143 return the armature 135 to its home position when the coil 133 is de-energized, thereby returning the element 126 to its uncoupling position. In other words, at least one return biasing member in the form of the return spring 141 urges the armature 135 through the plate 145 to a return position which corresponds to the uncoupling position of the element 126. The spring 144 biases the armature 135 towards the coupling position.

The housing may also include a stamped metal cup which preferably has holes to allow oil to circulate within the housing. Preferably, the at least one coil 133, the housing part 113, the cup and the armature 135 comprise a low profile solenoid. The locking element 126 may be a metal injection molded (i.e. MIM) strut.

When the storage element is a synthetic rubber strut, it may include a rigid insert and an elastomeric outer covering layer, bonded to the insert. The outer covering layer may be molded over the insert in a thermoset injection molding process. The storage element may carry high temperature-resistant elastomeric material defining opposite end sections of the storage element. One of the end sections is configured to deflect upon abutting engagement with the shoulder 124 and the other end section deflects upon engagement with a shoulder of the notch plate 112.

The housing part 115 has an apertured attachment flange 149 or possibly two apertured attachment flanges to attach the apparatus 115 to the coupling member (not shown) of the coupling assembly.

The element 126 includes at least one and, preferably, two projecting leg portions 151 which provide an attachment location for the leading end 137 of the armature 135. Each leg portion 151 has an aperture (not shown). The apparatus 115 further comprises a pivot pin 155 received within each aperture to allow rotational movement of the element 126 in response to reciprocating movement of the armature 135 wherein the leading end 137 of the armature 135 is connected to the element 126 via the pivot pin 155.

Preferably, each aperture is an oblong aperture which receives the pivot pin 155 to allow both rotation and translational movement of the element 126 in response to reciprocating movement of the armature 135.

Each locking strut 126 may comprise any suitable rigid material such as metal, (i.e. steel). In accordance with at least one embodiment of the invention, each storage strut may comprise any suitable base polymer that displays rubber-like elasticity, such as an unsaturated or saturated rubber material including, but not limited to, a nitrile rubber such as a hydrogenated nitrile butadiene rubber (HNBR). The storage struts are configured to dampen rotation and, consequently, engagement noise of the clutch assembly. For example, a portion or portions of each storage strut such as the end portion and/or middle portions of each storage strut may comprise one or more elastomeric materials, and the remainder of each storage strut may comprise a metal, such as the metal steel insert.

Generally, each of the storage elements carries resilient material defining the opposite end sections of the storage element. Each storage element is movable between coupling and uncoupling positions between the member 112 and the end wall 128 of the housing part 113. The coupling position is characterized by abutting engagement of the opposite end sections with respective shoulders of the member 112 and the end wall 128. The uncoupling position is characterized by non-abutting engagement of one of its end sections with at least one of the members 112 and the end wall 128. Each end section is configured to deflect or compress upon abutting engagement with respective shoulders of the member 112 and the end wall 128.

FIG. 11 shows a magnetic field sensor or device, generally indicated at 100. The device 100 may be a Hall effect sensor which senses position of the strut 126. The strut 126 may carry or support a rare-earth, automotive grade, magnet or pellet (now shown) which may be embedded in a hole formed in the outer surface of the strut 126. In that case, the strut 126 is a non-ferrous strut such as an aluminum strut. Alternatively, and preferably, the strut 126 is a ferromagnetic strut.

The device 100 typically has three wires 108 (input, output and ground) and provides an industry standard, push-pull voltage output based on position of the strut 126 in the pocket 122. The device 100 accurately detects the position of the strut 126 with a single output (i.e., voltage output). The device 100 is preferably mounted adjacent to and below the pocket 122 and the wires 108 extend through an aperture formed in the plate and through an aperture formed through the side wall or skirt of the housing part 113. The wires 108 are coupled to a solenoid controller which, in turn, is coupled to a main controller and to a coil drive circuit which supplies drive signals to the coil 133 in response to control signals from the solenoid controller. The device 100 may be held in place by fasteners or by an adhesive so that an upper surface of the device 100 is in close proximity to the bottom surface of the strut 126 in the uncoupling position of the strut 126.

The sensor 100 is typically back-biased when the strut 126 is ferromagnetic and typically includes a Hall sensor or sensing element mounted on a circuit board on which other electronics or components are mounted, as is well-known in the art. The sensor 100 is preferably back-biased in that it includes a rare-earth magnet which creates a magnetic flux or field which varies as the strut 126 moves. The sensor 100 may comprise a back-biased, Hall effect device available from Allegro Microsystems.

In other words, the device 100 is preferably a back-biased device wherein the device includes a rare earth pellet or magnet whose magnetic field varies as the strut 126 moves towards and away from its uncoupled position. The variable magnetic field is sensed by the magnetic sensing element of the device 100.

The output signal from the device 100 is a feedback signal which is received by the solenoid controller which, in turn, provides a control signal to the circuit which, in turn, provides drive control signals to control current flow to the coil 133. By providing feedback, the resulting closed-loop control system has improved sensitivity, accuracy and repeatability.

As described in detail below with reference to FIGS. 2-6, the above-noted brake and clutch assemblies 15 and 17, respectively, in combination with the rest of the power-split architecture shown in FIG. 1 can operate in a number of different modes including two overdrive modes and simultaneously disconnect the traction motor (i.e. Tract) from the output shaft 16 during overdrive operation to further enhance highway fuel economy. The power flow shows a C1 clutch (i.e. 17) which provides three selectable connection options. The C1 clutch allows (1) an output lay shaft to be connected to either the traction motor (through G4) or (2) to the ICE input through an overdrive gear ratio (G7-G8), and furthermore also (3) provides a neutral state which disconnects both nodes from output. The power flow also includes the C2 (i.e. 15) clutch which can be used to ground the MG2/sun gear node for overdrive purposes. In this case, the power floor provides two overdrive modes which have separate gear ratios to output providing the ability to shift between the ratios to optimize highway fuel economy. Furthermore, C1 also provides a method to disconnect the MG1 from output during highway operation to maximize fuel economy with minimal additional hardware.

Figure 2:
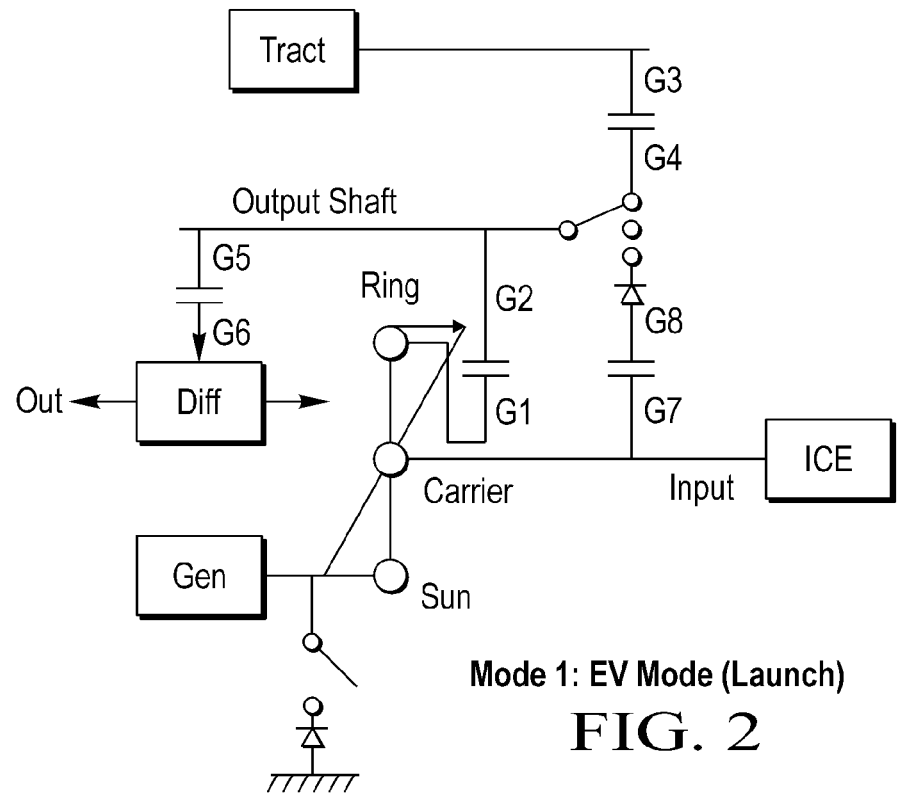
FIG. 2 is a view similar to the view of FIG. 1 showing operation in an electric vehicle (i.e. EV) launch mode together with a corresponding lever diagram.

Referring now to FIG. 2, the EV mode is used for launch. C1 is engaged to connect the G4 to output. The traction motor (TG2 or Tract) provides all tractive force to output. C2 is not engaged at this point and the ICE is not running.

Figure 3:
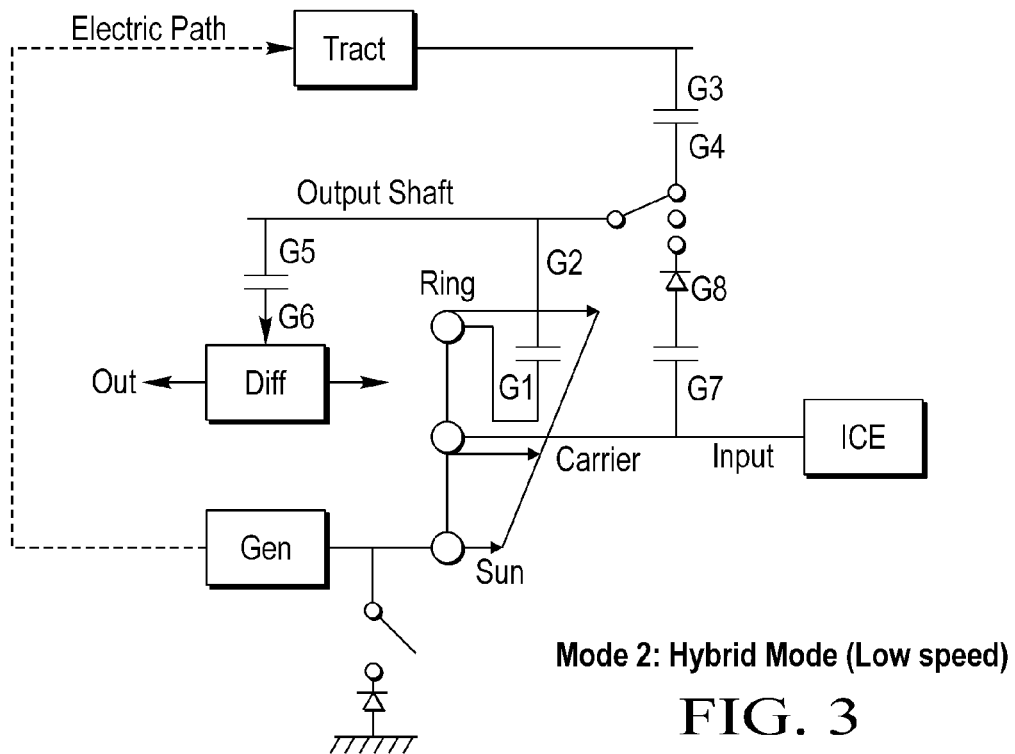
FIG. 3 is a view similar to the views of FIGS. 1 and 2 showing operation in a low speed hybrid mode together with a corresponding lever diagram and a path for electricity from an electric motor-generator unit to an electric traction motor.

Referring now to FIG. 3, the mode illustrated therein is the low speed (i.e. less than 20 mph) hybrid operation mode. In this mode the C1 clutch is engaged with G4 to provide the traction motor (MG1) with a path to output. The ICE is now engaged and is also providing tractive force to output. C2 is disengaged allowing the generator (MG2) to spin. The relative speeds of MG1 and MG2 are controlled electrically to allow the ICE to operate at the most efficient speed/torque point possible. Modes 1 and 2 are the same as the traditional power split architecture.

Figure 4:
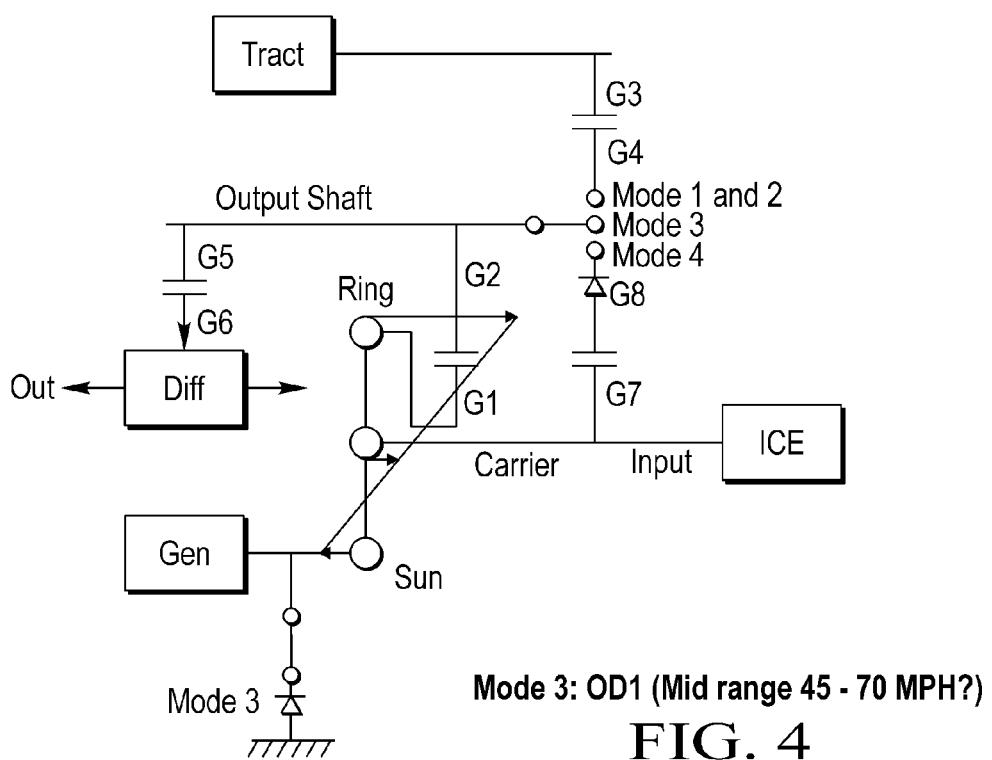
FIG. 4 is a view similar to the views of FIGS. 1-3 showing operation in a first overdrive gas mode together with a corresponding lever diagram and gear/ratio table and various operating modes called out.

Referring now to FIG. 4, mode 3 is the first overdrive mode. In this mode C1 is now the neutral state and has disconnected both G4 and G8 from output. C2 is now engaged and is grounding the MG2/sun gear node. In this mode the layshaft overdrive gear has been disconnected and tractive force is supplied by the ICE only via the pathway. MG1 is also disconnected and MG2 is now grounded which minimized any losses associated with the spinning of the electric motors during highway operation.

Figure 5:
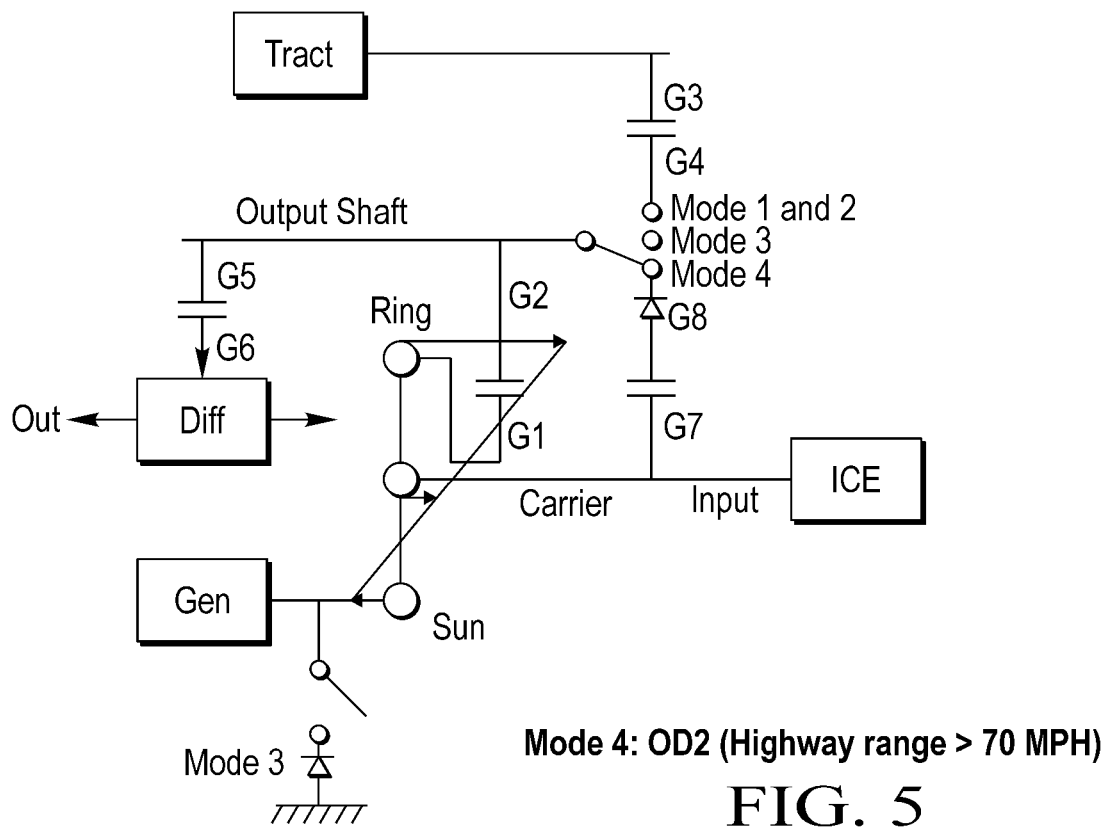
FIG. 5 is a view similar to the views of FIGS. 1-4 showing operation in a second overdrive gas mode together with a corresponding lever diagram and gear/ratio table and various operating modes called out.
Figure 6:
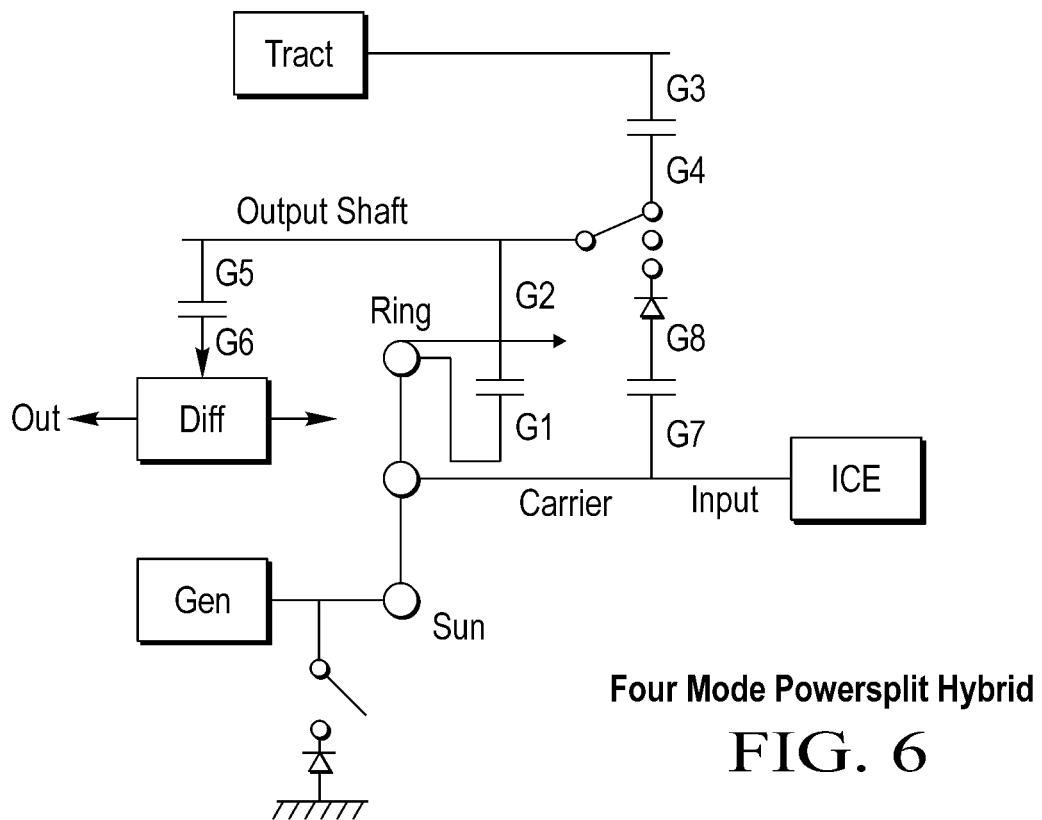
FIG. 6 is a view similar to the views of FIGS. 1-5 together with exemplary values for the various gears and a gear/ratio table for the overdrive modes.

Referring now to FIG. 5, mode 4 is the second overdrive ratio or mode. C1 is engaged with the G8 overdrive gear. This connection is through a one-way-clutch and will provide a direct path to output through the lay shaft overdrive gear path. C2 is disconnected and is allowing the MG2 generator to spin. In this mode MG1 is now disconnected from the output shaft 16 completely and the ICE is providing all tractive force through the G7-G8 overdrive pathway. The tractive force will not be passed through the planetary gearset in this mode but the nodes of the gearset are still connected to other elements in the transmission and will be driven to spin by those elements. This includes MG2, which will cause some losses and slightly reduced fuel economy.

Referring now to FIGS. 12-26, there is illustrated a second embodiment of a high-efficiency drive system 10' including a transmission for a multi-mode, powersplit, hybrid electric vehicle. Because of the similarities in hardware between FIGS. 12-26, only FIG. 12 has reference numbers. In general, the architecture is substantially the same as the first embodiment (and consequently the same reference numbers are used with a single prime designation) but with the addition of a second non-friction clutch assembly 21' substantially the same as the clutch assembly 17 (C1) of the first embodiment and a second non-friction brake assembly 23' which functions as a 2-way clutch. The brake assembly 23' preferably includes a pair of 1-way clutches such as the 1-way clutch 15' which is substantially the same as the brake assembly 15 (C2).

Figure 14:
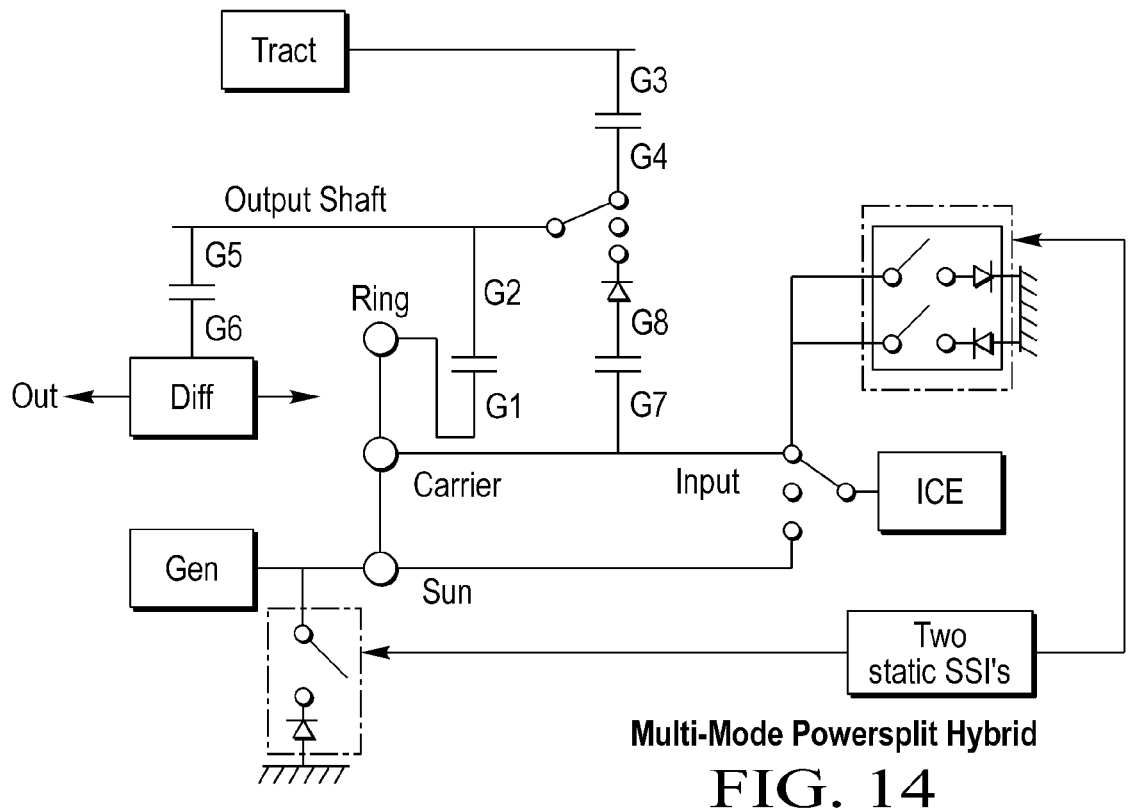
FIG. 14 is a view similar to the view of FIG. 12 with two static SSIs specifically called out.

The architecture of FIGS. 12-14 generally:
1) Improves highway fuel economy by having two overdrive modes and disconnecting the two electrical machines for even greater fuel economy;
2) Provides a "gas" path for reverse to make this a viable truck hybrid powerflow;
3) Provides a path to use both electrical machines at launch and reverse to boost torque/performance; and
4) All the above not impacting the powerflow for city driving (EV/hybrid mode).

Figure 15:
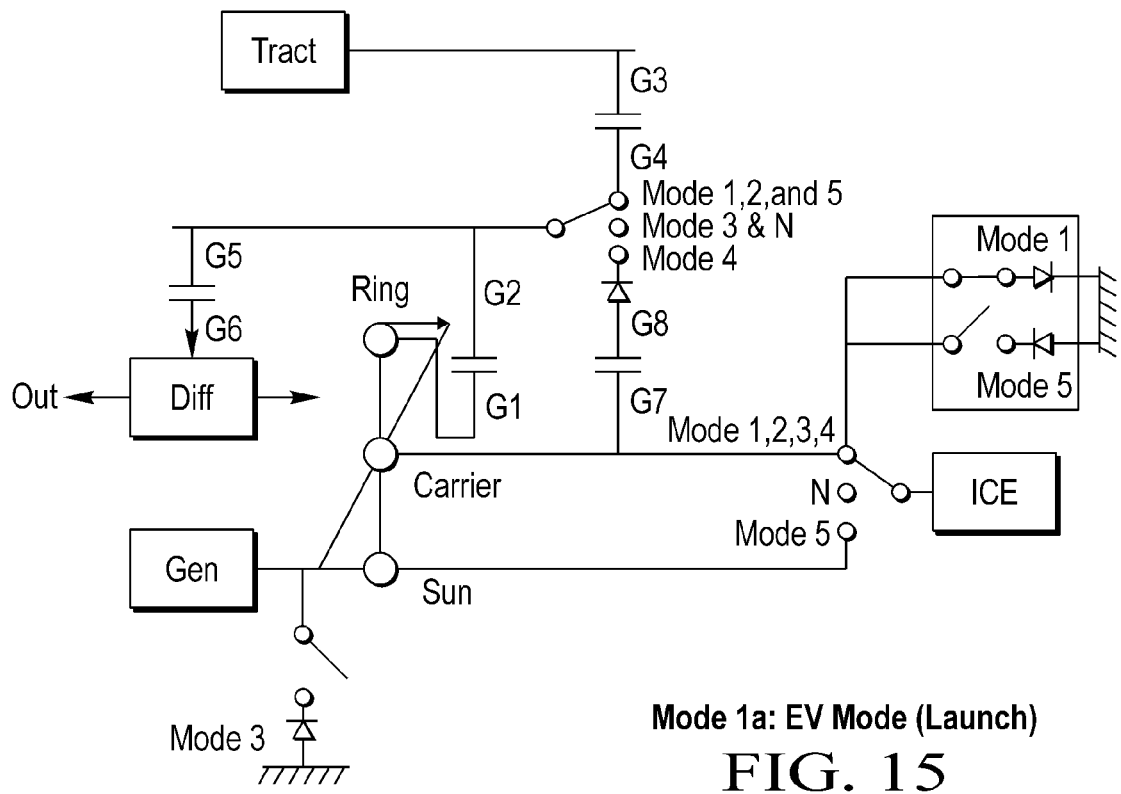
FIG. 15 is a view similar to the view of FIG. 12 showing an electric vehicle (EV) launch mode together with a corresponding lever diagram with the various operating modes called out.

Referring now to FIG. 15, a first EV launch mode is illustrated wherein nothing changes from the current powersplit design except the carrier is grounded in preparation for boost.

Figure 16:
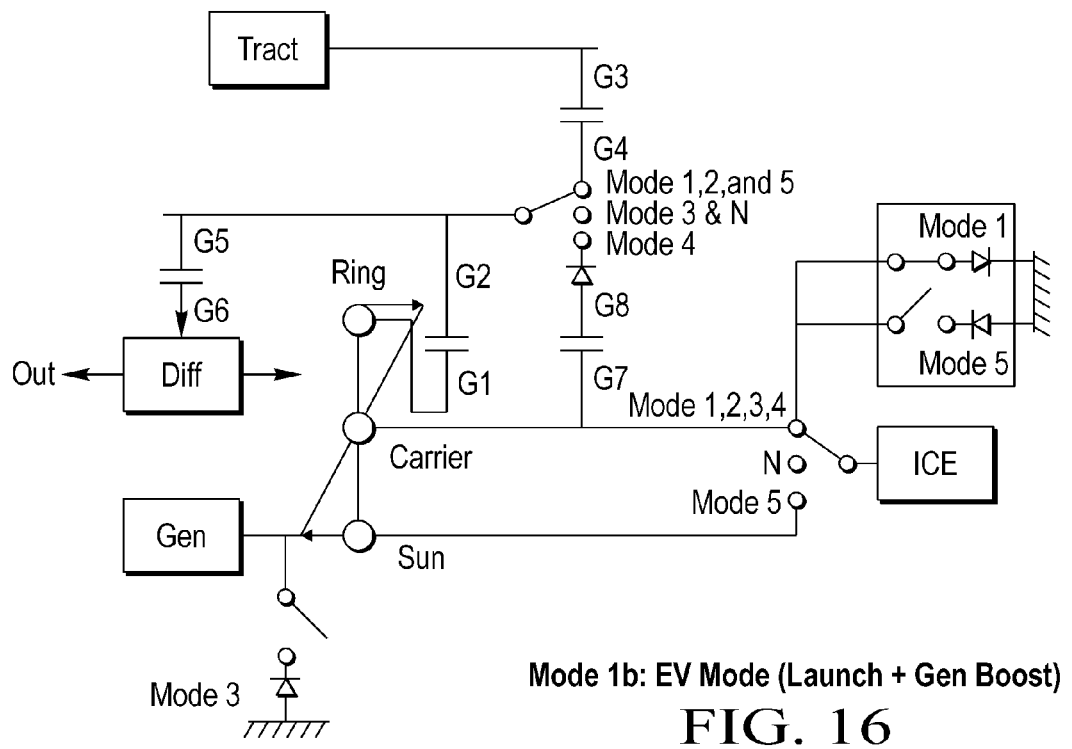
FIG. 16 is a view similar to the view of FIG. 15 showing a second EV launch mode with a generator boost together with a corresponding lever diagram.

Referring now to FIG. 16, a second EV launch and Gen boost mode is illustrated. If more performance is commanded, the Gen can operate in the reverse direction, the carrier is the reaction node. The ratio to the Diff from the Gen is the same ratio as the traction motor is to the Diff. A significant amount of boost can be realized for increased performance.

Figure 17:
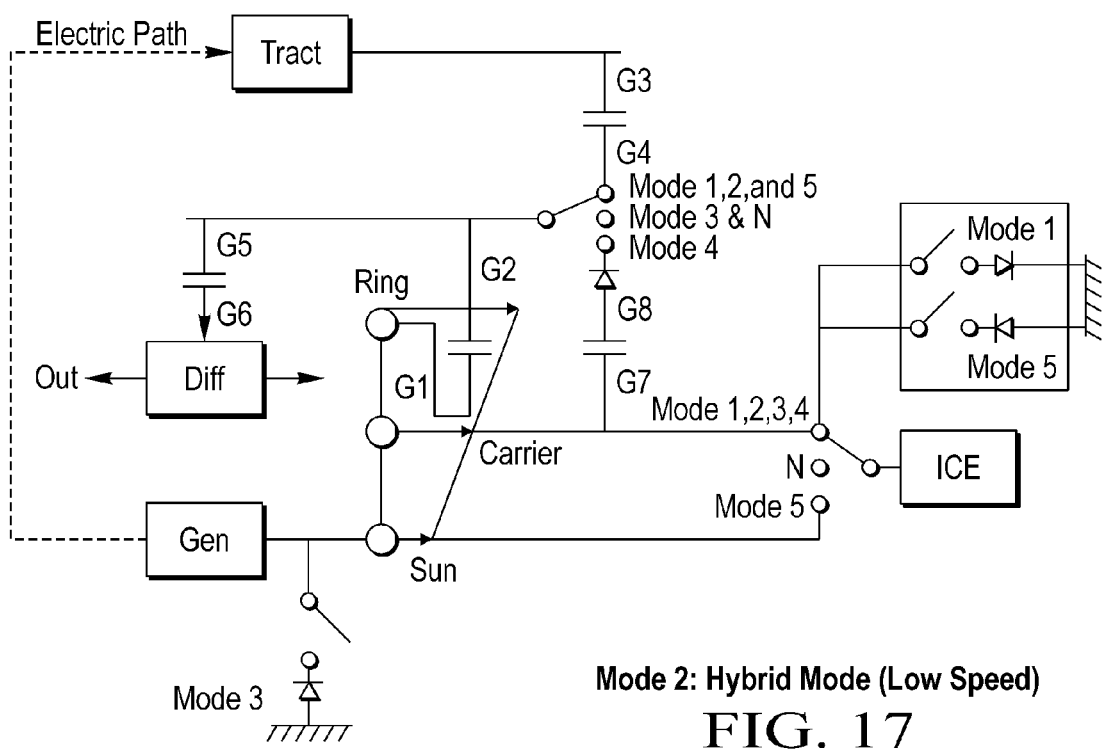
FIG. 17 is a view similar to views of FIGS. 15 and 16 showing a low speed, hybrid mode together with a corresponding lever diagram and a path for electricity from an electric motor-generator unit to an electric traction motor.

Referring now to FIG. 17, a low speed hybrid mode is illustrated. At some low speed (for example, <20 MPH) the ICE is started and hybrid mode begins. Again, nothing changes from today's powersplit in hybrid mode.

Figure 18:
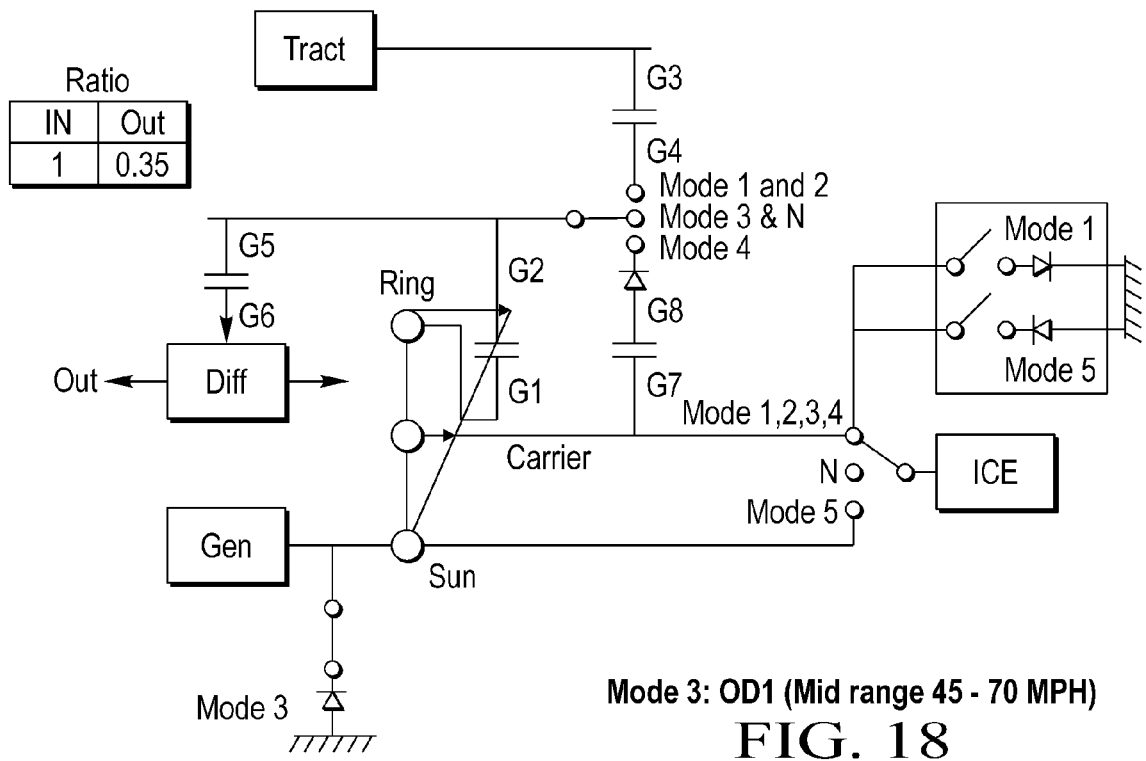
FIG. 18 is a view similar to the views of FIGS. 15-17 showing operation in a first overdrive gas mode, together with a corresponding lever diagram and gear/ratio table.

Referring now to FIG. 18, a first overdrive, mid-range mode is illustrated. The static solenoid, controllable mechanical diode, CMD, (i.e. C2) grounds the sun gear.

Figure 19:
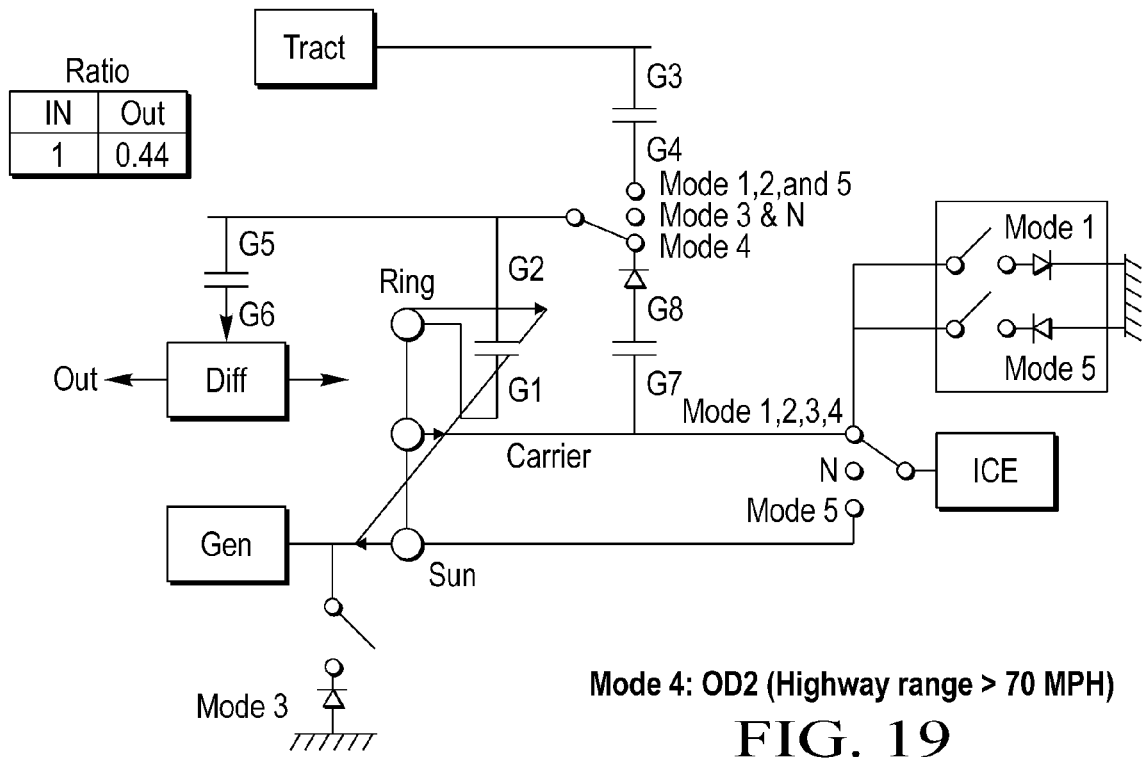
FIG. 19 is a view similar to the views of FIGS. 15-18 showing operation in a second overdrive gas mode together with a corresponding lever diagram and gear/ratio table.

Referring now to FIG. 19, a second overdrive mode (having a highway MPH range higher than the first range of the first overdrive mode) is illustrated. This mode is an even deeper OD ratio than the first OD ratio with the added benefit that both E-machines are not spinning. The ICE is in a true, gas only, OD range. The step from Mode 3 to 4 is 1.375 and the shift is achieved CVT-like from one fixed ratio to the next. The same clutch device, (i.e. C1) disconnects the unused traction motor while connecting the G7/G8 torque path to the output shaft 16'.

Figure 20:
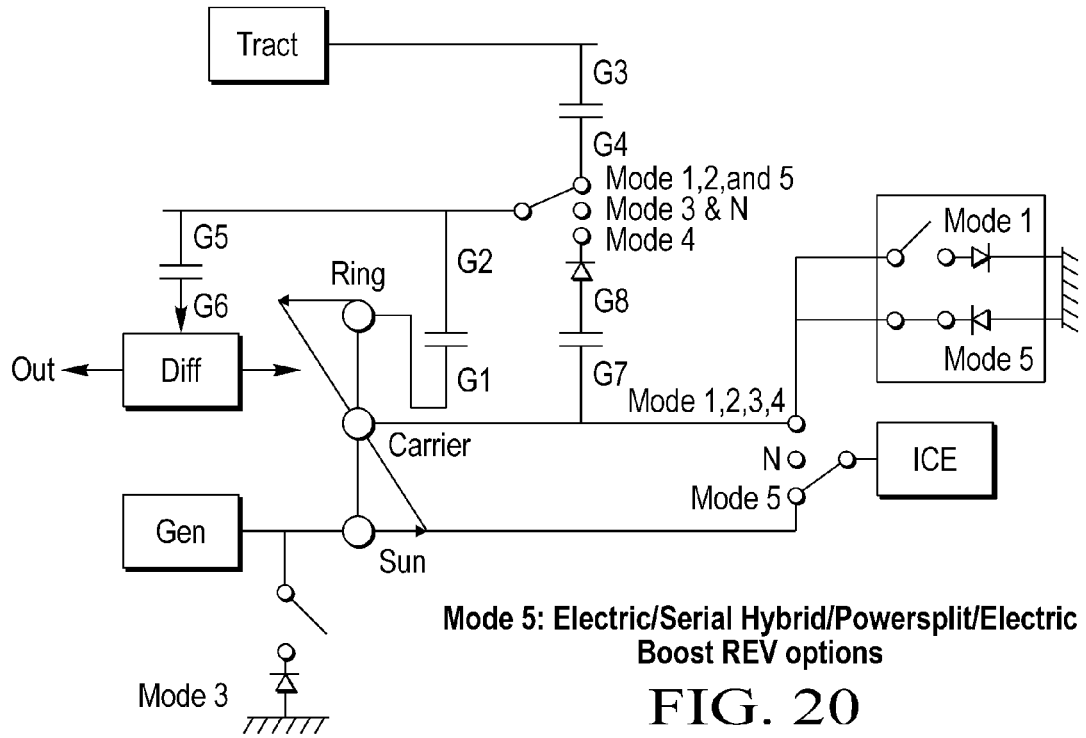
FIG. 20 is a view similar to the views of FIGS. 15-19 which architecture allows for at least four options for a reverse mode depending on charge/torque demand and showing a corresponding lever diagram.
Figure 23:
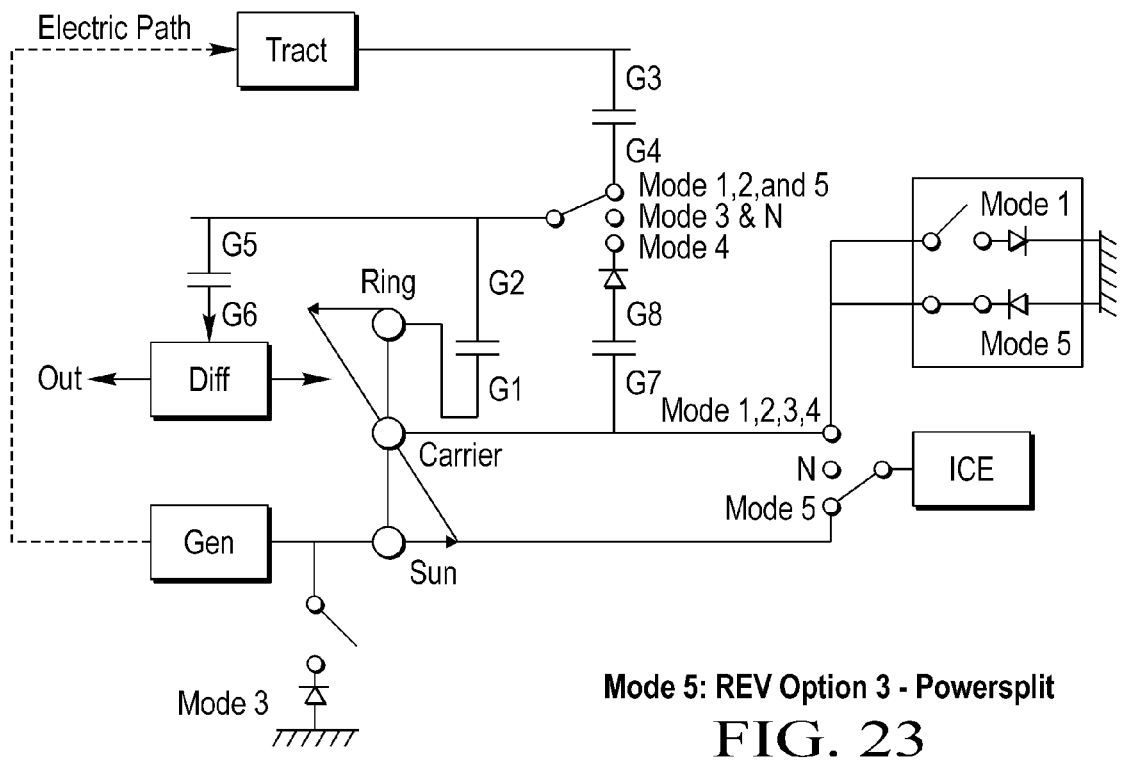
FIG. 23 is a view similar to the view of FIG. 20 showing operation in a third option for the reverse mode (power-split reverse) and showing a corresponding lever diagram and a path for electricity to the traction motor.
Figure 24:
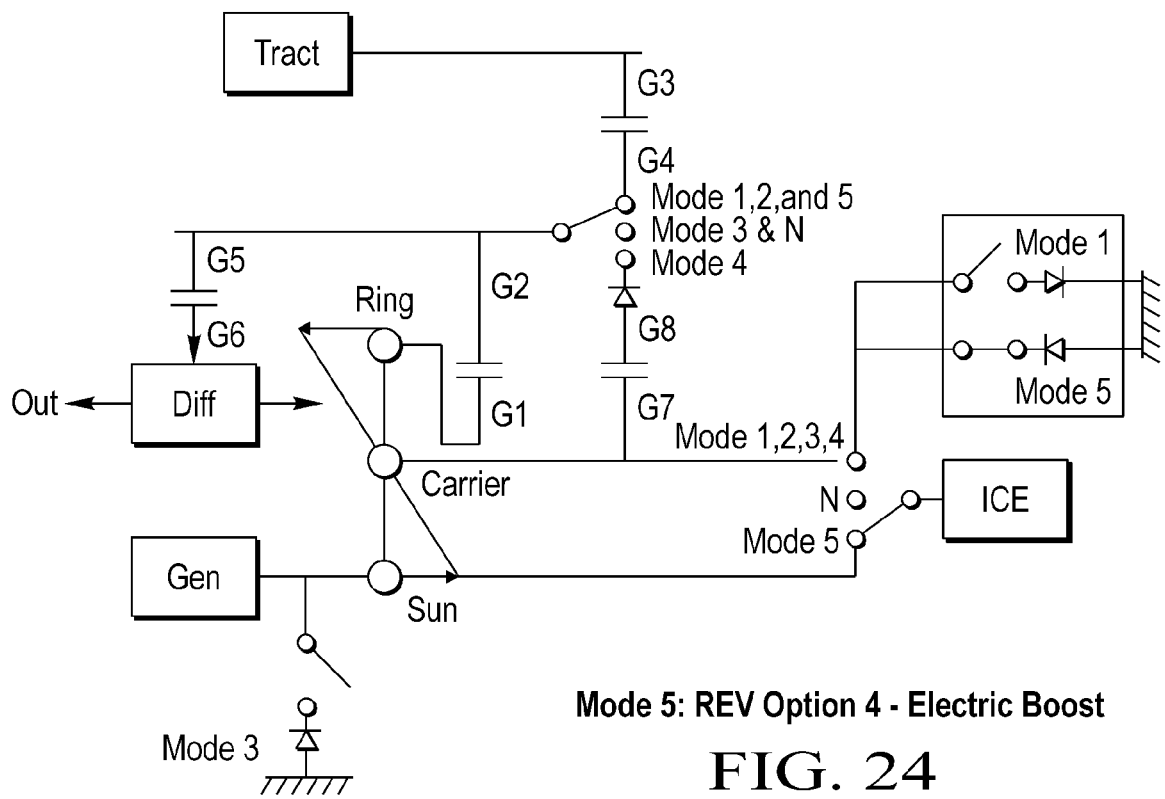
FIG. 24 is a view similar to the view of FIG. 20 showing operation in a fourth option for the reverse mode (i.e. electric boost) and showing a corresponding lever diagram.

Referring now to FIG. 20, the architecture illustrated allows four different options for reverse depending on the state of charge/torque demand as follows:
1) Current—Electric reverse with just the traction motor (FIG. 21);
2) The ICE/Gen produces electric power to fraction motor (carrier is not grounded thus serial hybrid REV) (FIG. 22);
3) Carrier is grounded and the ICE splits power to the Gen and mechanical path to Diff (powersplit REV) (FIG. 23); and
4) Carrier is grounded, the ICE is off, both electrical machines are used for reverse for boosted torque (FIG. 24).

Figure 21:
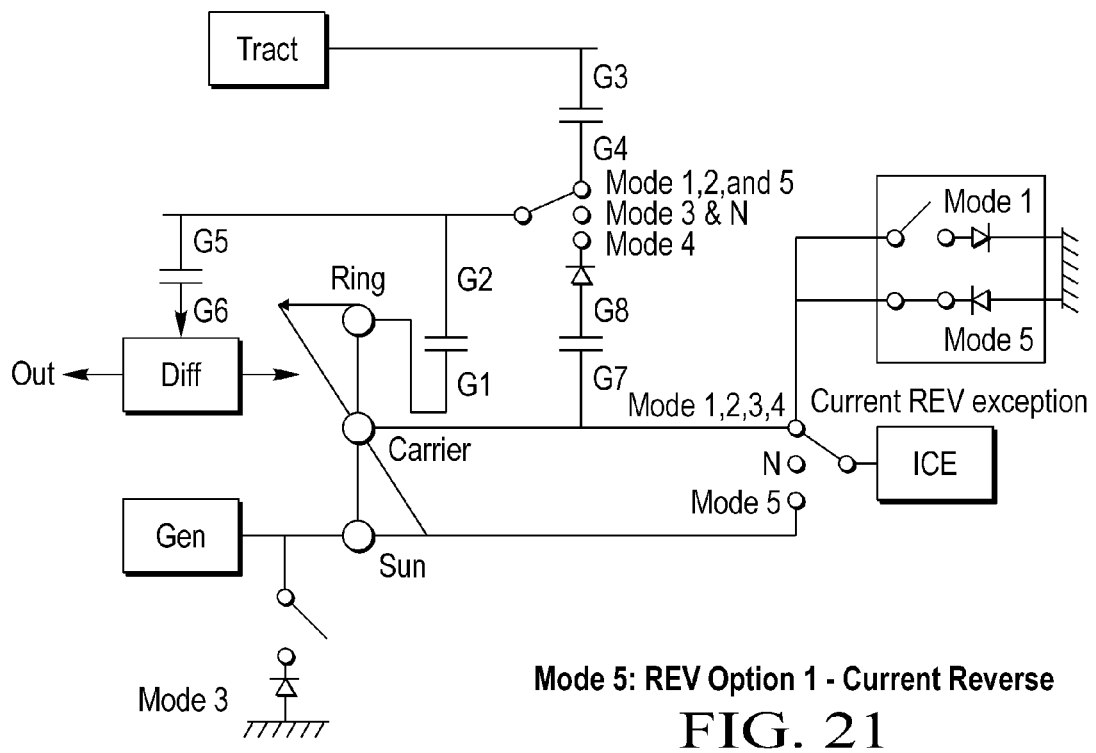
FIG. 21 is a view similar to the view of FIG. 20 showing operation in a first option for the reverse mode (electric current reverse with just a traction motor)

Referring specifically to FIG. 21, a current reverse mode is illustrated wherein if the state of charge is good and torque demand is adequate, this REV mode can be used.

Figure 22:
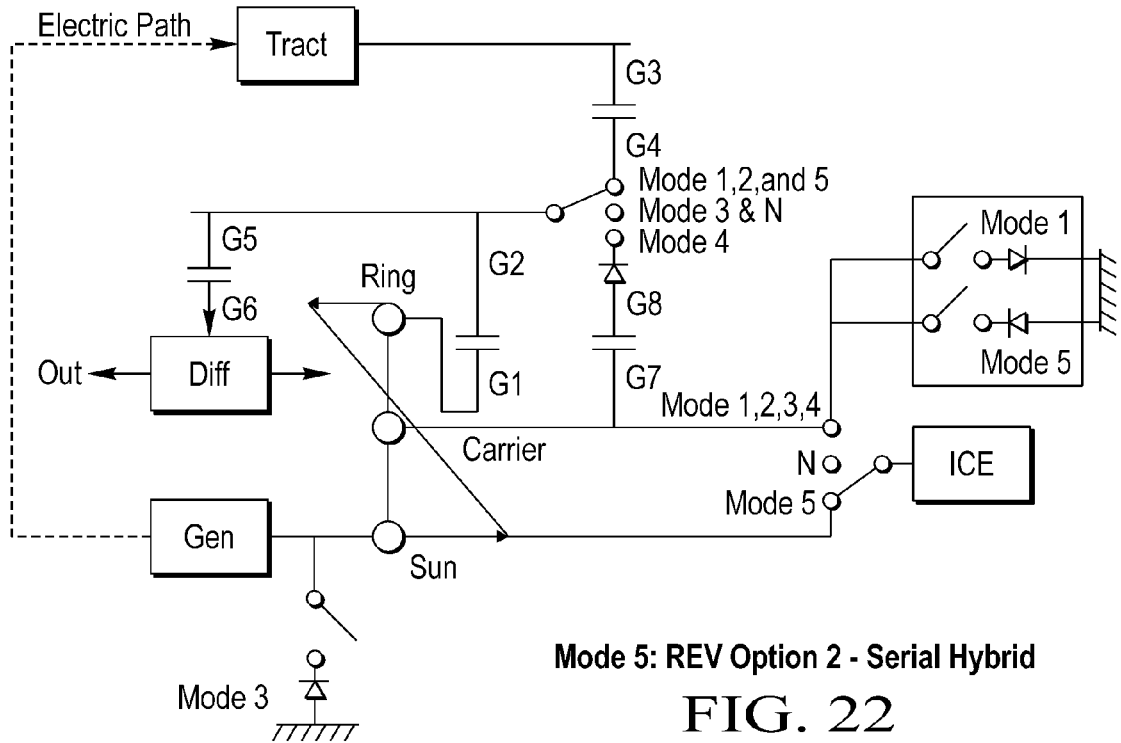
FIG. 22 is a view similar to the view of FIG. 20 showing operation in a second option for the reverse mode (or serial hybrid reverse) and showing a corresponding lever diagram and a path for electricity to the traction motor.

Referring now to FIG. 22, a serial hybrid reverse mode is illustrated. The ICE/Gen are connected and separate from the Tract electric motor. The ICE and Gen can be run independent of the Tract electric motor. This mode could be used for aux. power generation as shown by the electric path. In this case, it is used for REV when the state of charge is low. This makes for a gas-powered reverse option via the Gen.

Referring now to FIG. 23, powersplit reverse mode is illustrated. The ICE/Gen are connected and reacted through the grounded carrier. Power from the ICE is split. An electric path exists from the Gen and a mechanical path is established with the grounding of the sun gear.

Referring now to FIG. 24, an electric-boost, reverse mode is illustrated. The ICE is off and the carrier is grounded. This mode is the same as launch mode except both electrical machines are operated in the reverse direction.

Figure 25:
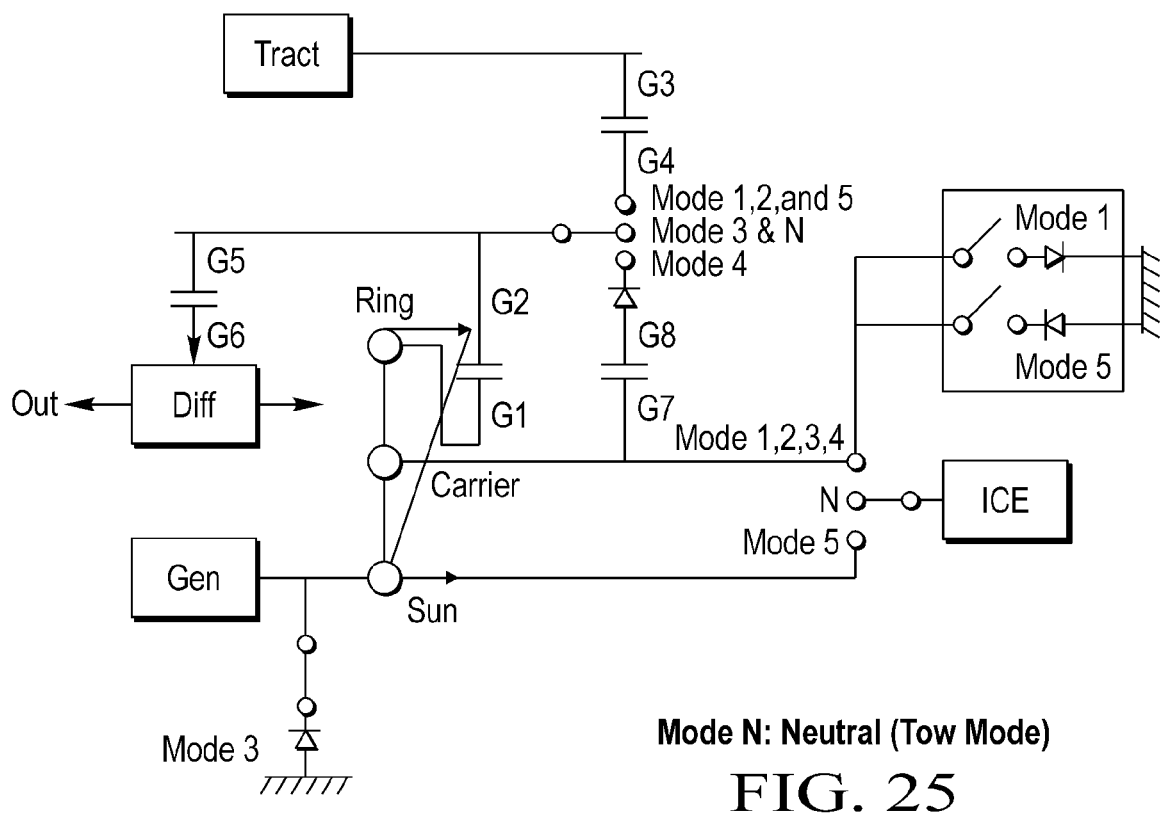
FIG. 25 is a view similar to the view of FIG. 20 showing operation in a neutral or low mode together with a lever diagram.

Referring now to FIG. 25, a tow or neutral mode is illustrated. The ICE and Tract electrical motor are disconnected. The sun gear is grounded. The goal is to have all electrical machines not rotating and the ICE is disconnected.

Figure 26:
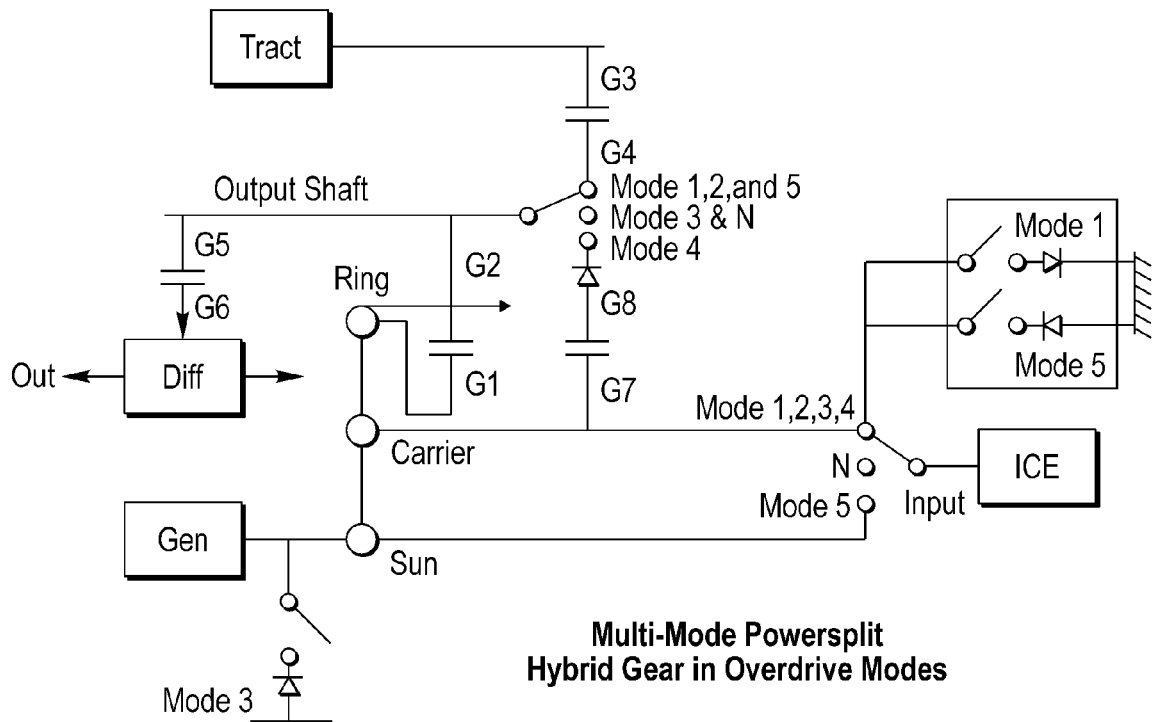
FIG. 26 is a view similar to the view of FIG. 20 together with a table to show gear tooth counts and speeds in the overdrive modes.

Referring now to FIG. 26, there is illustrated the previously described architecture in the overdrive modes (i.e. modes 3 and 4).

Figure 27:
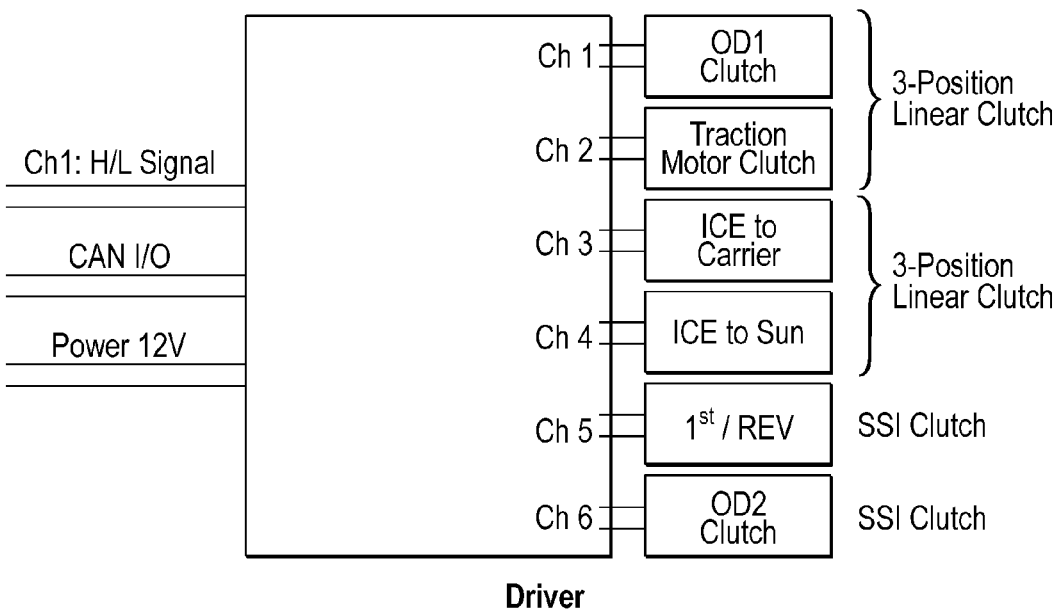
FIG. 27 is a schematic view of driver circuits which can be multiplexed for various channels to control the various clutches.

Referring now to FIG. 27, there is illustrated a number of driver circuits that can be multiplexed for various channels to control the various clutches (i.e. both clutch and brake assemblies) of the embodiment of the present invention. The following are a number of preliminary driver requirements:
(Optional) Fail off capability—All clutches connected to the driver would be turned off if the driver sensed a loss of the 12V power. The clutches would be electrically off. The mechanical state of a given clutch may be stuck "on" due to being torque locked;
The driver will be able to accurately measure resistance in the coils of a given clutch to determine the temperature of a given clutch T=F(R). This is for any power compensation that may be required as a function of temperature P=F(T);
Apply currents will have the ability to be profiled for NVH concerns if required;
Ability to multiplex up to four channels;
CAN I/O capability for multiple clutches and sensors;
One single H/L input for Channel 1; and
Max current TBD, 12V (very stable, design to 10V to 16V);

Referring now to FIGS. 28-34, there is illustrated a third embodiment of a high-efficiency drive system 10" including a transmission for a multi-mode, powersplit, hybrid electric vehicle. Because of similarities in hardware between FIGS. 28-34, only FIG. 28 has reference numbers. In general, the architecture is substantially the same as the first and second embodiments (and consequently the same reference numbers are used with a double prime designation) but with the addition of a second non-friction clutch assembly 21" substantially the same as the clutch assembly 17 (C1) of the first embodiment and a second non-friction brake assembly 23" which functions as a 2-way clutch. The brake assembly 23" preferably includes a pair of 1-way clutches such as the 1-way clutch 15" which is substantially the same as the brake assembly 15 (C2).

The architecture of FIGS. 28-34 generally:
1) Improves highway fuel economy by having two overdrive modes and disconnecting one of the two electrical machines for even greater fuel economy;
2) Provides a "gas" path for reverse to make this a viable truck hybrid powerflow;
3) Provides a path to use both electrical machines at launch and reverse to boost torque/performance; and
4) All of the above while not impacting the powerflow for city driving (EV/hybrid mode).

Figure 29:
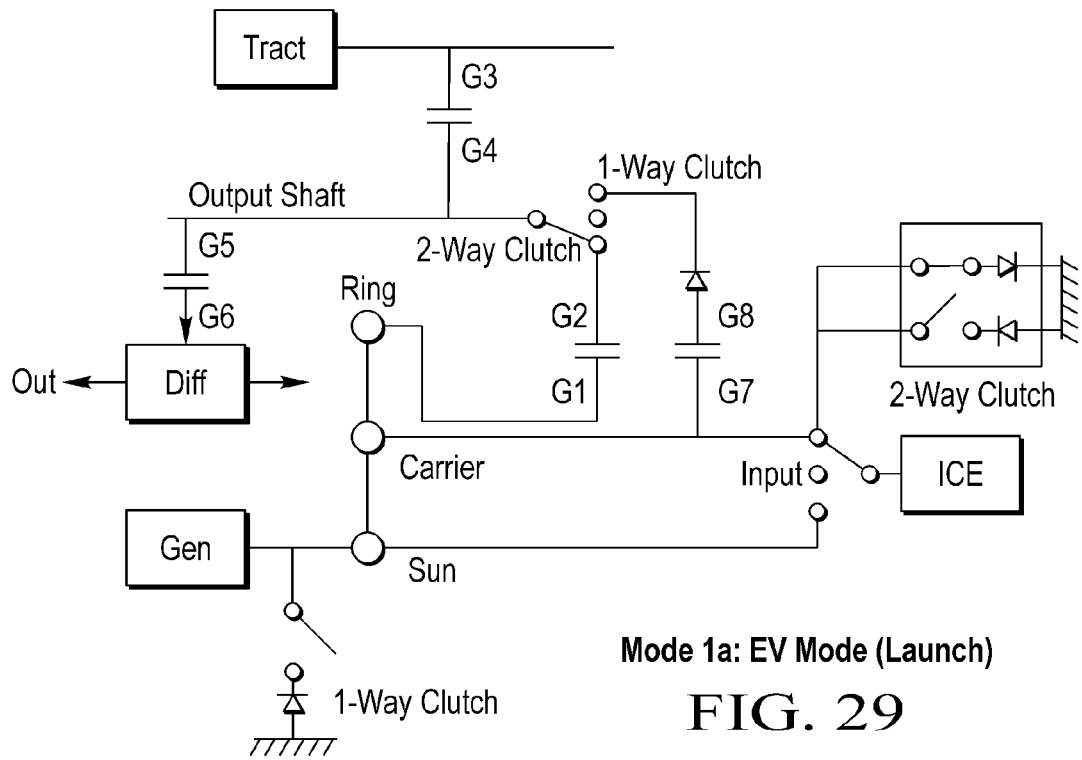
FIG. 29 is a view similar to the view of FIG. 28 showing an electric vehicle (EV) launch mode.

Referring now to FIG. 29, a first EV launch mode (with the traction motor "on") is illustrated wherein the carrier is grounded in preparation for boost.

Figure 30:
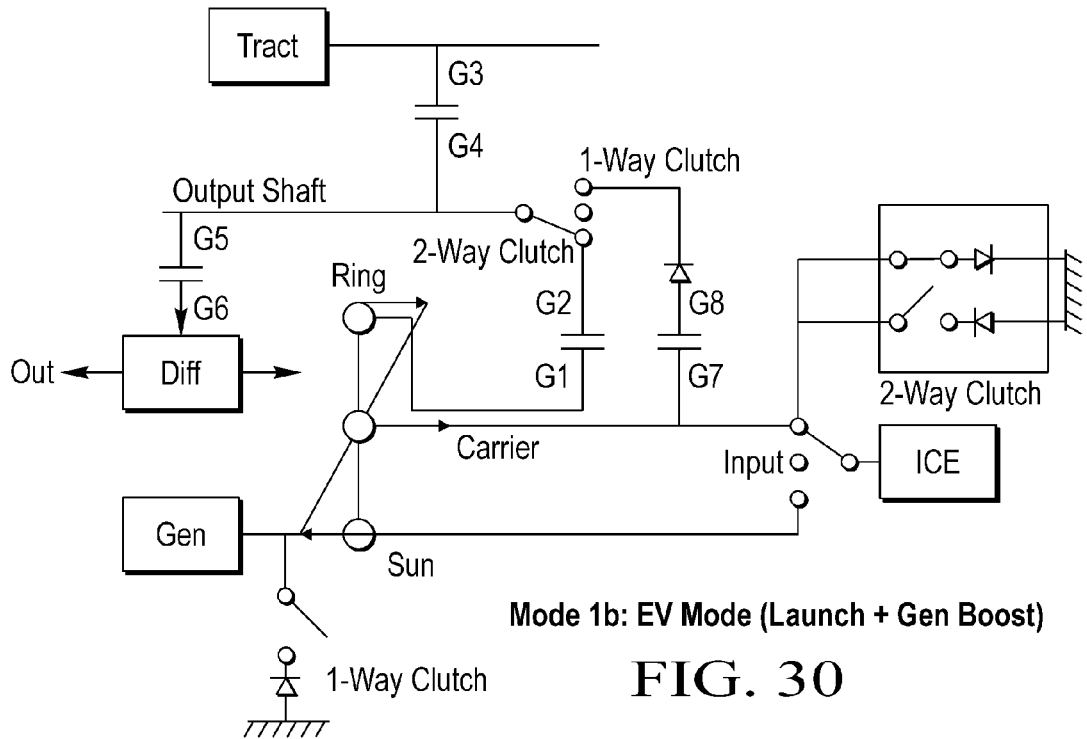
FIG. 30 is a view similar to the view of FIG. 28 showing a second EV launch mode with a generator boost together with a corresponding lever diagram.

Referring now to FIG. 30, a second EV launch and Gen boost mode (with the traction motor and the Gen "on") is illustrated. If more performance is commanded, the Gen can operate in the reverse direction, the carrier is the reaction node. The ratio to the Diff from the Gen is the same ratio as the traction motor is to the Diff. A significant amount of boost can be realized for increased performance.

Figure 31:
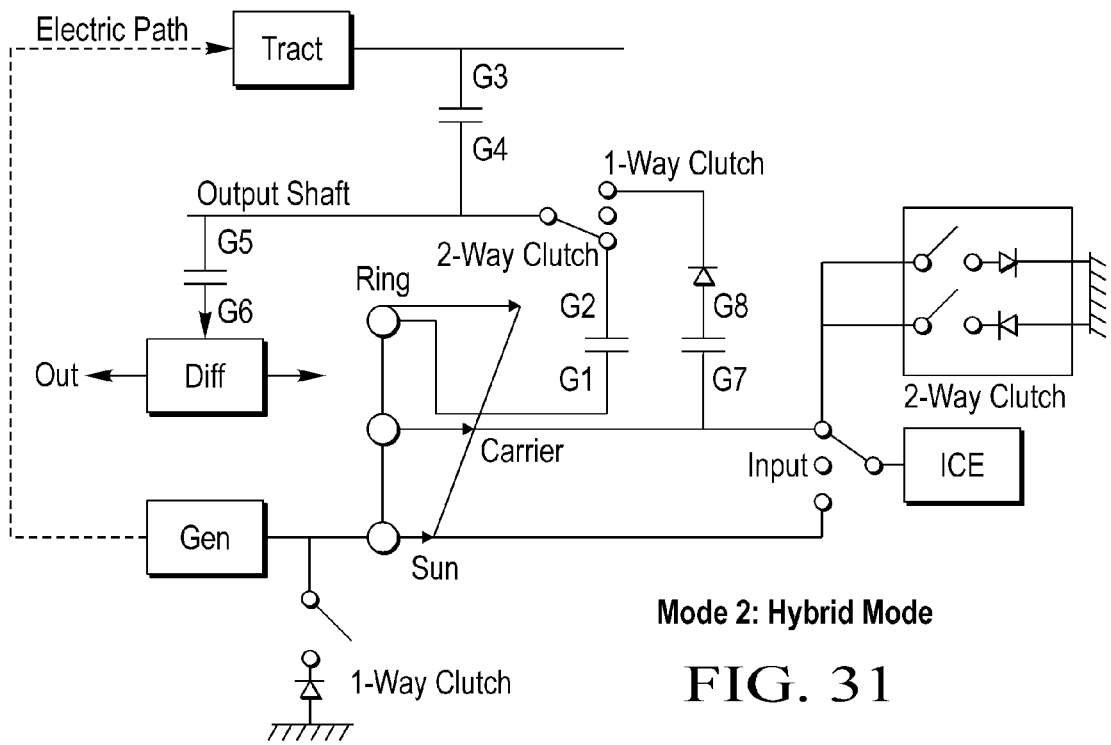
FIG. 31 is a view similar to the views of FIGS. 29 and 30 showing a low speed, hybrid mode together with a corresponding lever diagram and a path for electricity to the traction motor.

Referring now to FIG. 31, a low speed hybrid mode is illustrated (with all three machines "on"). At some low speed (for example, <20 MPH) the ICE is started and hybrid mode begins.

Figure 32:
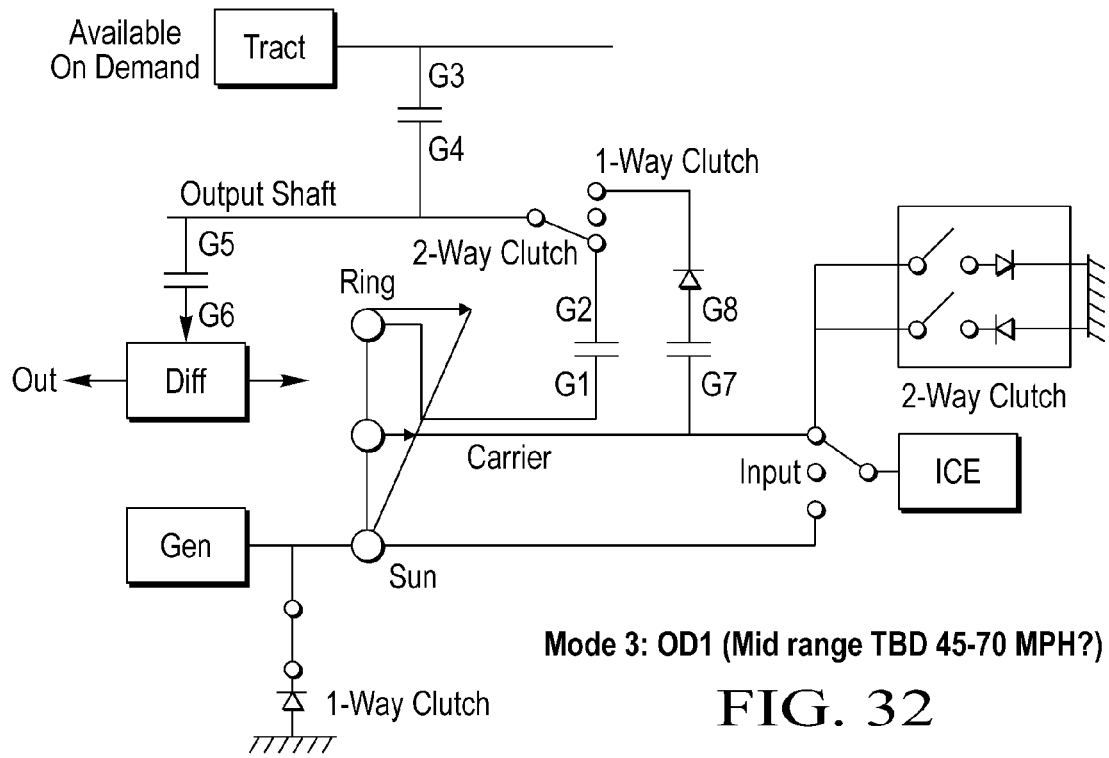
FIG. 32 is a view similar to the views of FIGS. 29-31 showing operation in a first overdrive gas mode, together with a corresponding lever diagram.

Referring now to FIG. 32, a first overdrive, mid-range mode is illustrated using the ICE. The static solenoid, controllable mechanical diode, CMD, (i.e. 15") grounds the sun gear. The traction motor is available on demand.

Figure 33:
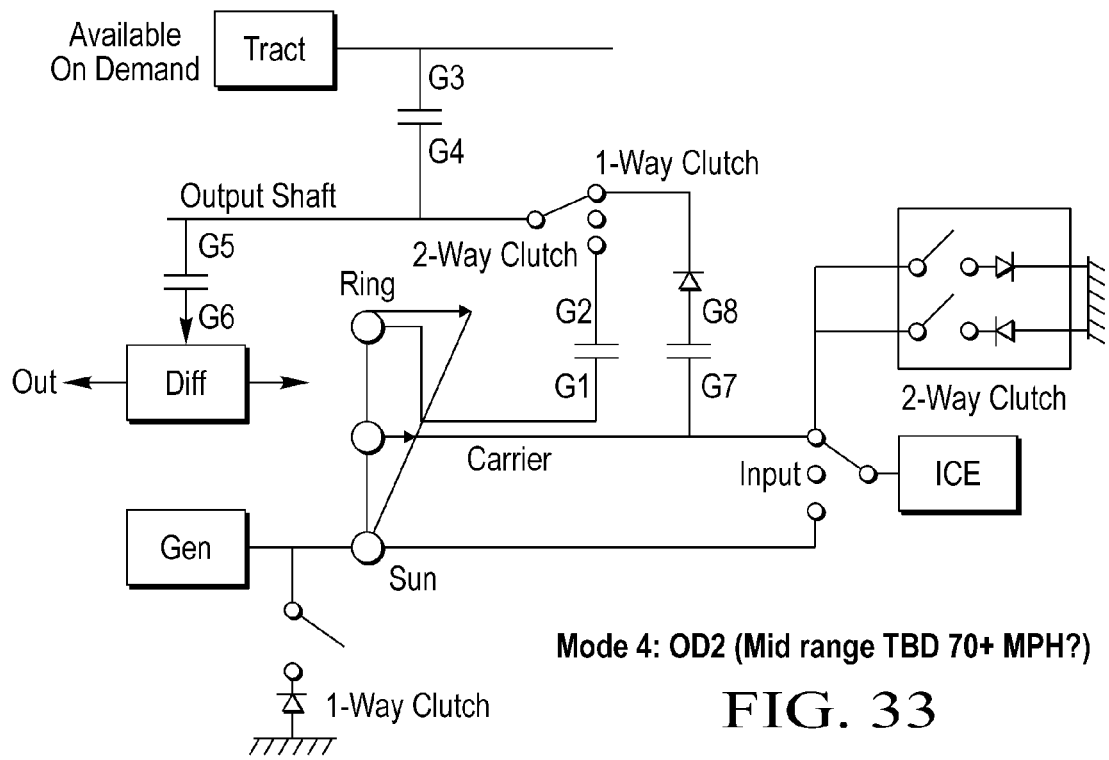
FIG. 33 is a view similar to the views of FIGS. 29-31 showing operation in a second overdrive gas mode together with a corresponding lever diagram.

Referring now to FIG. 33, a second overdrive mode (having a highway MPH range higher than the first range of the first overdrive mode) is illustrated. This mode is an even deeper OD ratio than the first OD ratio with the added benefit that one of the E-machines (i.e. Gen) is not spinning. The ICE is in a true, gas only, OD range. The traction motor is available on demand. The step from Mode 3 to 4 may be 1.375 and the shift is achieved CVT-like from one fixed ratio to the next. The same clutch device disconnects the unused Gen while connecting the G7/G8 torque path to the output shaft 16".

Figure 34:
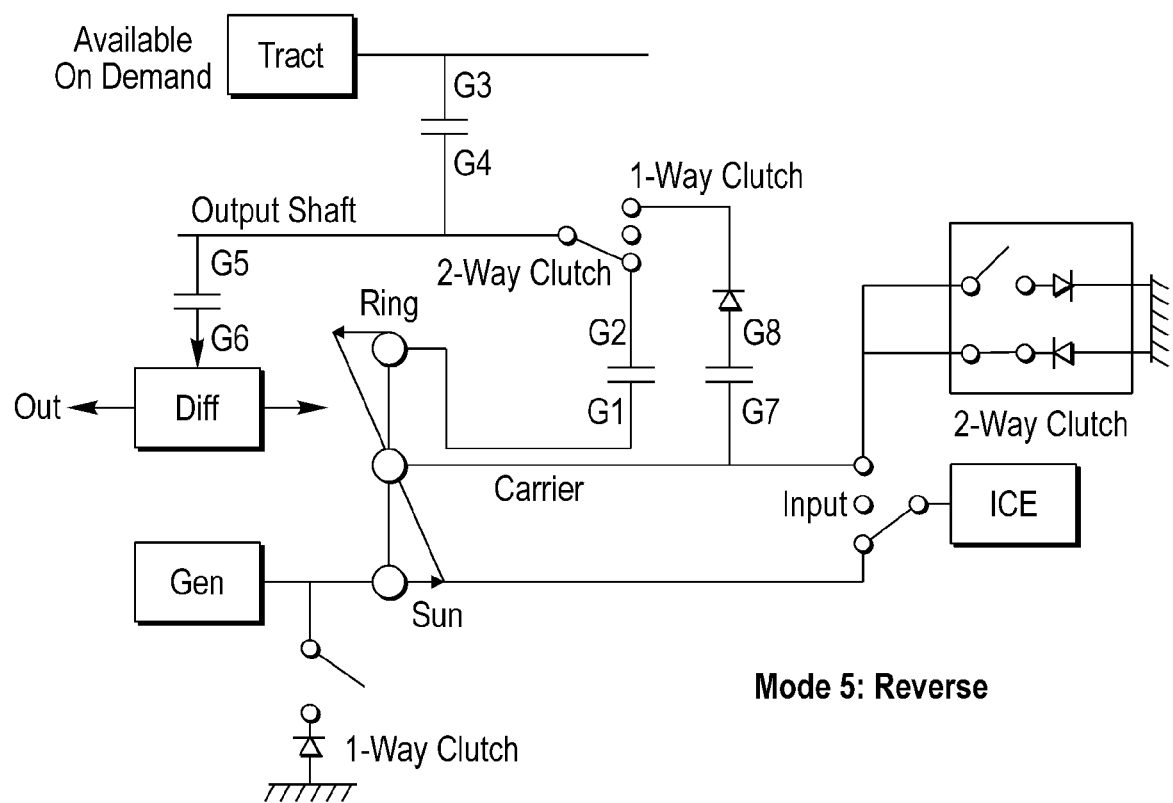
FIG. 34 is a view similar to the views of FIGS. 29-33 showing operation in a reverse mode together with a corresponding lever diagram.

Referring now to FIG. 34, the architecture illustrated allows reverse wherein the traction motor is available on demand and wherein the Gen is used.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A high-efficiency drive system including a transmission for a hybrid electric vehicle, the system comprising:
   a gear set including first, second and third elements, the first element connecting connectable with a transmission output shaft, an output shaft of a non-electrical machine connecting with the second element for driving the second element;
   a transmission housing;
   a first electrical machine having a first output shaft connectable with the first element and the transmission output shaft for driving the transmission output shaft in response to an electrical signal;
   a second electrical machine having a second output shaft connectable with the third element for driving the third element, the output shaft of the non-electrical machine connectable with the third element through the second element for driving the third element; and
   a non-friction clutch assembly being non-hydraulically controlled to change between a first coupled state for coupling either the first or second output shaft to the transmission output shaft and a first uncoupled state for uncoupling whichever of the first or second output shafts had been coupled from the transmission output shaft, the clutch assembly also being non-hydraulically controlled to change between a second coupled state for coupling the output shaft of the non-electrical machine to the transmission output shaft and a second uncoupled state for uncoupling the output shaft of the non-electrical machine from the transmission output shaft.

2. The system as claimed in claim 1, wherein the gear set is a planetary gear set and wherein the first, second and third elements comprise a ring gear, a carrier and a sun gear, respectively.

3. The system as claimed in claim 1, wherein the system has a plurality of different operating modes including a reverse gear or operating mode powered both electrically and non-electrically.

4. The system as claimed in claim 1, wherein the system has a plurality of different operating modes including an overdrive operating mode powered non-electrically and wherein the output shaft of the non-electrical machine is coupled to the transmission output shaft in the overdrive operating mode.

5. The system as claimed in claim 4, wherein the overdrive operating mode is a first overdrive operating mode having a first gear ratio and wherein the system has a second overdrive operating mode having a second gear ratio different from the first gear ratio and powered non-electrically.

6. The system as claimed in claim 5, further comprising a non-friction brake assembly having a coupled state in which the third element is coupled to the housing and an uncoupled state in which the third element is uncoupled from the housing, the brake assembly being non-hydraulically controlled to change state.

7. The system as claimed in claim 1, wherein the clutch assembly includes a switchable linear actuator device for transitioning between coupled states of the clutch assembly.

8. The system as claimed in claim 7, wherein the actuator device includes a stator structure including at least one electromagnetic source to create an electromagnetically switched magnetic field and a translator structure including a magnetically latching permanent magnet source magnetically coupled to the stator structure across a radial air gap and supported for translational movement relative to the stator structure along an axis between a plurality of predefined discrete axial positions which correspond to different coupling states of the clutch assembly.

9. The system as claimed in claim 6, wherein the brake assembly includes an electromechanical apparatus connecting with the output shaft of the second electrical machine.

10. The system as claimed in claim 1, wherein the first electrical machine is an electric motor.

11. The system as claimed in claim 1, wherein the second electrical machine is an electric motor-generator unit.

12. The system as claimed in claim 1, wherein the non-electrical machine comprises an internal combustion engine.

13. The system as claimed in claim 1, wherein the transmission is a power-split transmission.

14. A high-efficiency drive system including a transmission for a hybrid electric vehicle, the system comprising:
   a gear set including first, second and third elements, the first element connectable with a transmission output shaft, an output shaft of a non-electrical machine connectable with the second element for driving the second element;
   a transmission housing;
   a first electrical machine having a first output shaft connectable with the first element and the transmission output shaft for driving the transmission output shaft in response to an electrical signal;
   a second electrical machine having a second output shaft connectable with the third element for driving the third element, the output shaft of the non-electrical machine connectable with the third element through the second element for driving the third element;
   a first non-friction clutch assembly being non-hydraulically controlled to change between a first coupled state for coupling either the first or second output shaft to the transmission output shaft and an uncoupled state for uncoupling whichever of the first or second output shafts had been coupled from the transmission output shaft, the first non-friction clutch assembly also being non-hydraulically controlled to change between a second coupled state for coupling the output shaft of the non-electrical machine to the transmission output shaft and a second uncoupled state for uncoupling the output shaft of the non-electrical machine from the transmission output shaft; and
   a second non-friction clutch assembly being non-hydraulically controlled to change between a first coupled state for coupling the output shaft of the non-electrical machine to the second element and a first uncoupled state for uncoupling the output shaft of the non-electrical machine from the second element, the second clutch assembly also being non-hydraulically controlled to change between a second coupled state for coupling the output shaft of the non-electrical machine to the third element and a second uncoupled state for uncoupling the output shaft of the non-electrical machine from the third element.

15. The system as claimed in claim 14, wherein the gear set is a planetary gear set and wherein the first, second and third elements comprise a ring gear, a carrier and a sun gear, respectively.

16. The system as claimed in claim 14, wherein the system has a plurality of different operating modes including a reverse gear or operating mode powered both electrically and non-electrically.

17. The system as claimed in claim 14, wherein the system has a plurality of different operating modes including an overdrive operating mode powered non-electrically and wherein the output shaft of the non-electrical machine is coupled to the transmission output shaft in the overdrive operating mode.

18. The system as claimed in claim 17, wherein the overdrive operating mode is a first overdrive operating mode having a first gear ratio and wherein the system has a second overdrive operating mode having a second gear ratio different from the first gear ratio and powered non-electrically.

19. The system as claimed in claim 18, further comprising a non-friction brake assembly having a coupled state for coupling the third element to the housing and an uncoupled state for uncoupling the third element from the housing, the brake assembly being non-hydraulically controlled to change state.

20. The system as claimed in claim 14, wherein each clutch assembly includes a switchable linear actuator device to control the coupling state of the clutch assembly.

21. The system as claimed in claim 20, wherein each actuator device includes a stator structure including at least one electromagnetic source to create an electromagnetically switched magnetic field and a translator structure including a magnetically latching permanent magnet source magnetically coupled to the stator structure across a radial air gap and supported for translational movement relative to the stator structure along an axis between a plurality of predefined discrete axial positions which correspond to different coupling states of the clutch assembly.

22. The system as claimed in claim 19, wherein the brake assembly includes an electromechanical apparatus connecting with the output shaft of the second electrical machine.

23. The system as claimed in claim 14, wherein the first electrical machine is an electric motor.

24. The system as claimed in claim 14, wherein the second electrical machine is an electric motor-generator unit.

25. The system as claimed in claim 14, wherein the non-electrical machine comprises an internal combustion engine.

26. The system as claimed in claim 14, wherein the transmission is a power-split transmission.

27. The system as claimed in claim 19 wherein the brake assembly is a first brake assembly and wherein the system further comprises a second brake assembly having a coupled state for coupling the second element to the housing and an uncoupled state for uncoupling the second element from the housing, the second brake assembly being non-hydraulically controlled to change state.

28. The system as claimed in claim 27, wherein the second brake assembly includes an electromechanical apparatus.

* * * * *

UNITED STATES PATENT AND TRADEMARK OFFICE
CERTIFICATE OF CORRECTION

| | | |
|---|---|---|
| PATENT NO. | : 9,441,708 B2 | Page 1 of 1 |
| APPLICATION NO. | : 14/882505 | |
| DATED | : September 13, 2016 | |
| INVENTOR(S) | : John W. Kimes et al. | |

It is certified that error appears in the above-identified patent and that said Letters Patent is hereby corrected as shown below:

In the Claims

Column 21, Line 9, Claim 1:
After "the first element"
Delete "connecting".

Signed and Sealed this
Tenth Day of January, 2017

Michelle K. Lee
*Director of the United States Patent and Trademark Office*